(12) United States Patent
Kobayashi et al.

(10) Patent No.: US 7,516,204 B2
(45) Date of Patent: Apr. 7, 2009

(54) INFORMATION PROCESSING METHOD AND APPARATUS

(75) Inventors: Toshihiro Kobayashi, Kawasaki (JP); Toshikazu Ohshima, Kawasaki (JP); Masakazu Fujiki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 484 days.

(21) Appl. No.: 10/546,168

(22) PCT Filed: Feb. 25, 2004

(86) PCT No.: PCT/JP2004/002218

§ 371 (c)(1),
(2), (4) Date: Aug. 18, 2005

(87) PCT Pub. No.: WO2004/077298

PCT Pub. Date: Sep. 10, 2004

(65) Prior Publication Data

US 2006/0089974 A1 Apr. 27, 2006

(30) Foreign Application Priority Data

Feb. 28, 2003 (JP) ............................. 2003-053900
Feb. 28, 2003 (JP) ............................. 2003-053901

(51) Int. Cl.
*G06F 15/173* (2006.01)
*G06F 15/167* (2006.01)
*G06F 7/00* (2006.01)
*G06F 12/00* (2006.01)
*G06F 17/00* (2006.01)

(52) U.S. Cl. ..................... 709/223; 709/213; 707/102; 707/201

(58) Field of Classification Search .............. 709/223, 709/213; 707/102
See application file for complete search history.

(56) References Cited

U.S. PATENT DOCUMENTS 5,577,960 A * 11/1996 Sasaki .......................... 463/32

(Continued)

FOREIGN PATENT DOCUMENTS

JP 9-259023 10/1997

(Continued)

OTHER PUBLICATIONS

G. Hesina, et al., "Distributed Open Inventor: A Practical Approach To Distributed 3D Graphics", pp. 74-81 (Dec. 25, 1991).
M. Maekawa, Bunsan Operating System (Distributed Operating System): Kyoritsu Shuppan, pp. 52-90 (Dec. 25, 1991).

*Primary Examiner*—William C Vaughn, Jr.
*Assistant Examiner*—Muktesh G Gupta
(74) *Attorney, Agent, or Firm*—Fitzpatrick, Cella, Harper & Scinto

(57) ABSTRACT

An information processing method for maintaining, in a system in which each of a plurality of client processes, connected via an information transmission medium, holds and uses shared data to be shared by the plurality of client processes, consistency of shared data held by the respective plurality of client processes, includes a holding step of holding the shared data, and a first issuance step of issuing, in response to a manipulation event request, a manipulation event that represents the manipulation to the shared data to the server process. In addition, a first manipulation execution step executes a manipulation to the shared data in response to a manipulation event received from the server process, and a second issuance step issues an issuance inhibition event to the server process. An inhibition step inhibits issuance of the manipulation event in the first issuance step after the issuance inhibition event is issued in the second issuance step until an event corresponding to the issuance inhibition event is received from the server process.

5 Claims, 35 Drawing Sheets

U.S. PATENT DOCUMENTS

| | | | | |
|---|---|---|---|---|
| 6,154,215 | A * | 11/2000 | Hopcroft et al. | 345/418 |
| 6,222,551 | B1 * | 4/2001 | Schneider et al. | 345/419 |
| 6,442,565 | B1 * | 8/2002 | Tyra et al. | 707/102 |
| 6,529,905 | B1 * | 3/2003 | Corsberg et al. | 707/8 |
| 6,571,278 | B1 * | 5/2003 | Negishi et al. | 709/213 |
| 6,687,753 | B2 * | 2/2004 | Schneider | 709/235 |
| 6,718,361 | B1 * | 4/2004 | Basani et al. | 709/201 |
| 6,859,821 | B1 * | 2/2005 | Ozzie et al. | 709/205 |
| 6,938,070 | B2 * | 8/2005 | Esposito | 709/205 |
| 6,973,455 | B1 * | 12/2005 | Vahalia et al. | 707/8 |
| 2002/0129103 | A1 * | 9/2002 | Birkler et al. | 709/203 |
| 2006/0075058 | A1 * | 4/2006 | Fujiki et al. | 709/213 |
| 2006/0167954 | A1 * | 7/2006 | Fujiki et al. | 707/201 |

FOREIGN PATENT DOCUMENTS

| | | |
|---|---|---|
| JP | 11-219309 | 8/1999 |
| JP | 11-272534 | 10/1999 |
| JP | 11-296479 | 10/1999 |

* cited by examiner

FIG. 9

| QUEUE ITEM No.1 | QUEUE ITEM No.2 | . . . . | QUEUE ITEM No.m |
|---|---|---|---|

F I G. 24
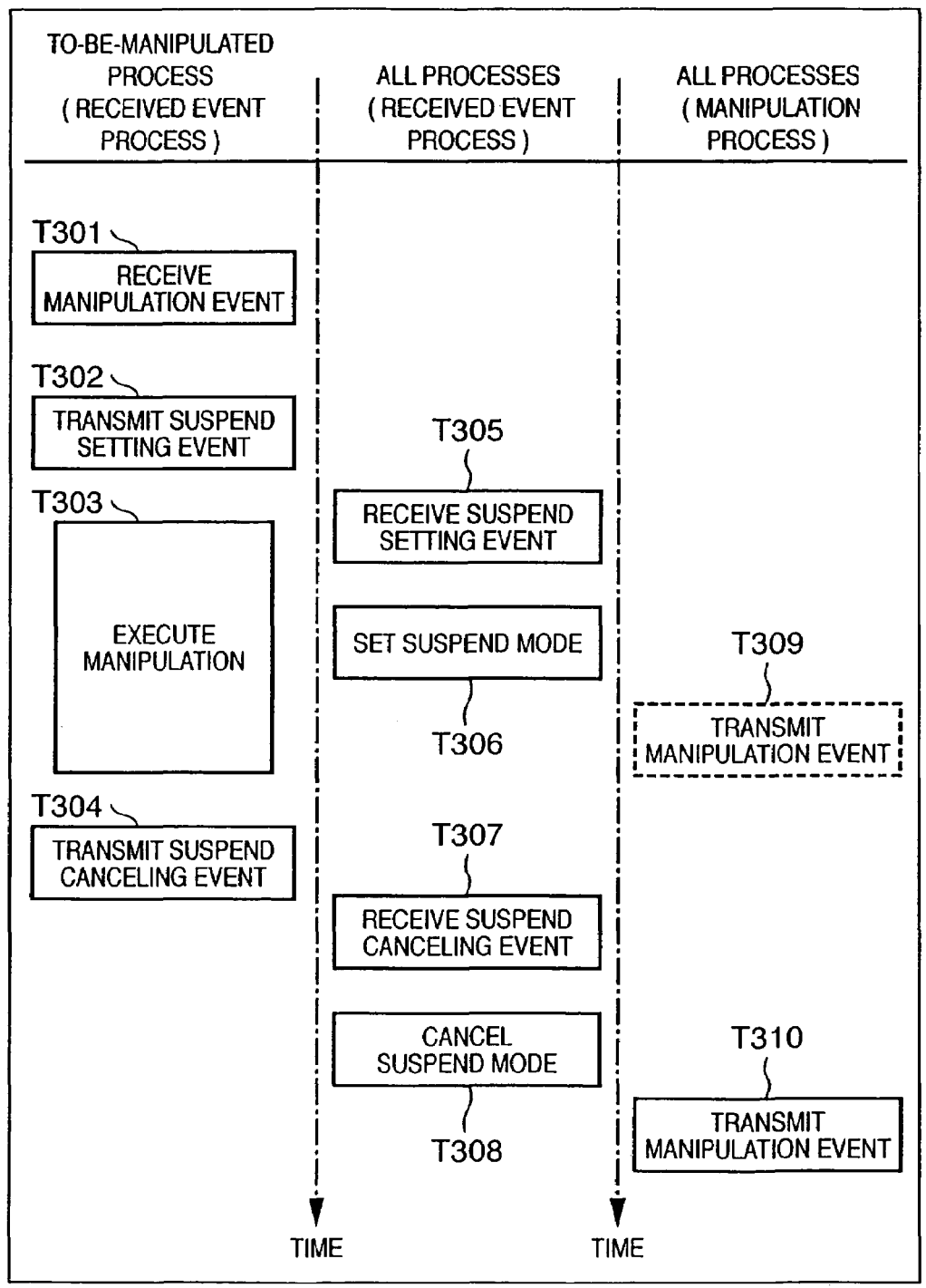

INFORMATION PROCESSING METHOD AND APPARATUS

TECHNICAL FIELD

The present invention relates to a technique for sharing data among a plurality of processes and, more particularly, to a technique suited to share a database that holds data which describes a three-dimensional (3D) virtual space among a plurality of processes via a network.

The present invention also relates to a technique for allowing a plurality of processes to attain collaborative operations via communications among the processes and, more particularly, to a technique for implementing reliable collaborative operations when respective processes possess shared data.

BACKGROUND ART

A technique for sharing a three-dimensional virtual space among different computer terminals is indispensable to implement remote meeting systems, network games, cooperative design systems, and the like.

Such system that shares a 3D virtual space refers to a large volume of data at short time intervals so as to draw moving images on the virtual space by computer graphics. At this time, it is not practical to acquire whole virtual space data held in one apparatus (e.g., server) via a network due to the narrow bandwidth of the current network.

Therefore, in a method which is currently adopted, respective terminals (processes) have copies of the virtual space data and generate CG images by referring to them. When an arbitrary manipulation (e.g., movement or rotation of a virtual object) has been made for the virtual space on a given terminal (process), information associated with that manipulation is transmitted to other terminals (processes) via the network, thus reflecting that information on the databases of the respective terminals. As a result, consistency among the databases of the respective computer terminals is maintained. In this process, a process for issuing a manipulation request and a process for reflecting the manipulation request on shared data, which are included in all processes, run in parallel.

Details of the sequence for holding consistency among the databases in the conventional virtual space sharing system will be described below. That is, a manipulation for the virtual space at a given computer terminal is immediately reflected on the local database of that terminal, and the manipulation information is transmitted to other computer terminals. Other terminals receive this manipulation information, and update their data according to the received manipulation information.

As an implementation example of such virtual space sharing system, Distributed Open Inventor (source: G. Heshina et. al.: "Distributed Open Inventor: A Practical Approach to Distributed 3D Graphics", in Proc. of the ACM Symposium on Virtual Reality Software and Technology (VRST'99), pp. 74-81, 1999) is known and hereby incorporated by reference.

However, in the conventional virtual space sharing system represented by the above reference, the contents of a given manipulation are immediately reflected on a database of a terminal at which that manipulation has been made, and other terminals update their databases after they receive that manipulation information. Therefore, the terminal at which the manipulation has been made and other terminals update their databases at different timings. Especially, if it takes long until reception of manipulation information due to the influence of network traffic or the like, the update timing differences of the databases among the terminals become large. For this reason, it is more likely that the terminals generate different drawing results of the virtual space. Also, the manipulation and update sequences of the databases are fixed to those described above, and the data update timing cannot be selected or adjusted.

By contrast, a system which allows a plurality of processes to nearly concurrently manipulate databases shared by these processes has been proposed. In this system, a server that maintains consistency of shared databases is provided independently of terminals. Each terminal issues a manipulation command associated with a change in contents of the shared databases, and transmits an event corresponding to that command to the server. On the other hand, the server receives the event transmitted from each terminal, and transmits that event to a plurality of terminals connected to the server. The respective terminals update their databases on the basis of manipulation information of the event received from the server. That is, since the respective terminals update their databases in response to reception of an event transmitted from the server as a trigger, they can execute manipulations at nearly concurrent timings.

In the above system, manipulations can be executed at nearly the same timings. However, a time lag is generated from when a given terminal issues a manipulation command associated with a change in contents of a database until an event corresponding to that manipulation command reaches other terminals and the terminals execute manipulations. Especially, when two or more manipulations are successive, a command of the subsequent manipulation (second manipulation) may be issued before an event associated with the previous manipulation (first manipulation) is received from the server. In such case, since the manipulation result of the first manipulation has not been reflected on the database, the second manipulation may result in an unintended consequence. To avoid this, issuance of the second manipulation command must be delayed.

However, the time period required from issuance until execution of a manipulation largely varies depending on the operating environment of the system. For this reason, it is not easy to determine a delay time period upon delaying issuance of the second manipulation command, and the issuance timing of a manipulation command is often limited. For this reason, a mechanism which guarantees that the first manipulation is actually executed after the command of the first manipulation is issued is demanded.

When respective processes hold copies of received data, each process uses a buffer for temporarily storing a received manipulation request to cope with a case wherein manipulation requests are generated at time intervals shorter than the time period required to process the manipulation request. However, in order to prevent manipulation requests from overflowing from the buffer (buffer overflow), a buffer with a sufficiently large size is required.

As described above, in an apparatus that makes collaborative operations by exchanging data among a plurality of processes, a reception buffer used by each process must be designed not to overflow. However, it is difficult to determine an optimal reception buffer size, and there is room for improvement.

DISCLOSURE OF INVENTION

The present invention has been made in consideration of the above problems, and has as its principal object to provide a mechanism which guarantees issuance of a subsequent manipulation command after a previously issued manipulation command is executed with respect to manipulations made for shared data which are shared by a plurality of processes, and to remove any limitation on manipulation command issuance timings.

It is another principal object of the present invention to easily guarantee an execution order of manipulations even when a plurality of terminals issue manipulation commands.

It is still another principal object of the present invention to provide an information processing method and apparatus which can implement highly reliable processes by a simple method in a system in which a plurality of processes make collaborative operations using inter-process communications.

According to an aspect of the present invention, it is provided an information processing method for maintaining consistency of shared data held by a plurality of processes in a system in which the plurality of processes which includes a server process and can communicate with each other, characterized by comprising: a first issuance step of issuing a manipulation event that represents the manipulation to the shared data to the server process; a first manipulation execution step of executing a manipulation to the shared data in response to a manipulation event received from the server process; a second issuance step of issuing an issuance inhibition event to the server process; a second manipulation execution step of receiving, from the server process, a response manipulation event which responds to the manipulation event issued in the first issuance step, and executing the manipulation of the shared data; and an inhibition step of inhibiting issuance of events in the first and second issuance steps after the issuance inhibition event is issued in the second issuance step until an event corresponding to the issuance inhibition event is received from the server process.

According to another aspect of the present invention, it is provided an information processing apparatus for maintaining consistency of shared data held by a plurality of processes in a system in which the plurality of processes which includes a server process and can communicate with each other, characterized by comprising: first issuance unit adapted to issue a manipulation event that represents the manipulation to the shared data to the server process; first manipulation execution unit adapted to manipulate the shared data in response to a manipulation event received from the server process; second issuance unit adapted to issue an issuance inhibition event to the server process; second manipulation execution unit adapted to receive, from the server process, a response manipulation event which responds to the manipulation event issued by said first issuance unit, and execute the manipulation of the shared data; and inhibition unit adapted to inhibit issuance of events by said first and second issuance units after the issuance inhibition event is issued by said second issuance unit until an event corresponding to the issuance inhibition event is received from the server process.

According to a further aspect of the present invention, it is provided an information processing method for sharing shared data with another process, characterized by comprising: an issuance step of transmitting a manipulation event indicating contents of the manipulation to the shared data; a receiving step of receiving a manipulation event; a manipulation execution step of executing, in response to the received manipulation event, a manipulation to the shared data; a suspension notification transmission step of transmitting a transmission suspension notification that notifies suspension of transmission of new manipulation events to the other processes upon reception of the manipulation event; and a cancel notification transmission step of transmitting, after the execution of the received manipulation event, a suspension cancel notification that cancels transmission suspension of new manipulation events to the other processes.

According to yet further aspect of the present invention, it is provided an information processing apparatus for sharing shared data with another process, characterized by comprising: issuance unit adapted to transmit a manipulation event indicating contents of the manipulation to the shared data; receiving unit adapted to receive a manipulation event; manipulation execution unit adapted to, in response to the received manipulation event, execute a manipulation to the shared data; suspension notification transmission unit adapted to transmit a transmission suspension notification that notifies suspension of transmission of new manipulation events to the other processes upon reception of the manipulation event; and cancel notification transmission unit adapted to transmit, after the execution of the received manipulation event, a suspension cancel notification that cancels transmission suspension of new manipulation events to the other processes.

According to another aspect of the present invention, it is provided a control program for making a computer execute an information processing method of the present invention and a storage medium storing the control program.

Other features and advantages of the present invention will be apparent from the following description taken in conjunction with the accompanying drawings, in which like reference characters designate the same or similar parts throughout the figures thereof.

BRIEF DESCRIPTION OF DRAWINGS

The accompanying drawings, which are incorporated in and constitute a part of the specification, illustrate embodiments of the invention and, together with the description, serve to explain the principles of the invention.

FIG. 9 shows an example of the data configuration of a manipulation queue;

FIG. 24 is a chart showing an information processing sequence according to the second embodiment;

BEST MODE FOR CARRYING OUT THE INVENTION

Preferred embodiments of the present invention will now be described in detail in accordance with the accompanying drawings.

First Embodiment

The first embodiment will explain an implementation example in which an information processing method according to the present invention is applied to a virtual space sharing system that allows a plurality of terminals to share scene databases which describe the structure and properties of a virtual space.

Figure 1:
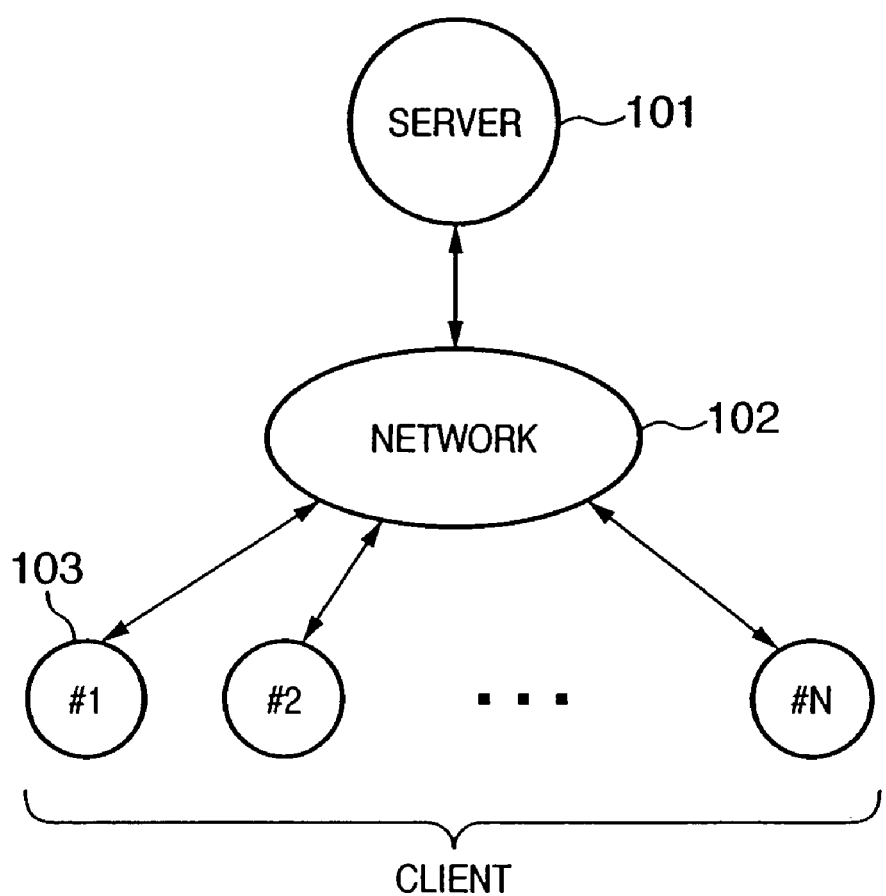
FIG. 1 is a block diagram showing the overall arrangement of a database sharing system according to the first embodiment.

FIG. 1 shows the overall arrangement of the virtual space sharing system of this embodiment. The system includes one server process 101 (also referred to as a "server"), and a plurality of client processes 103 (also referred to as "clients"), which exchange data via a network 102. Each client holds a scene database which describes the structure and properties of a common virtual space. Note that a plurality of terminals which are connected to be able to communicate with each other using a LAN, public telephone network, or Internet as the communication path 102 can be exemplified as the hardware arrangement that implements the arrangement shown in FIG. 1. In this embodiment, the network 102 is a LAN built on the Ethernet®. Note that either a wireless or wired information transmission medium may be used.

Note that the communication path 102 may be common to all processes, as shown in FIG. 24, or a plurality of dedicated communication paths may be present among some processes.

In such case, one or a plurality of processes 101 and 103 that form a process group can run on respective terminals, and the total number of processes need not always match that of terminals. Also, the communication path 102 can use arbitrary communication media other than those described above as long as it allows communications among processes in terminals.

A term "database manipulation" used in the following description will be explained. A "manipulation" of a database indicates a process for rewriting the contents of a database in an arbitrary process having a shared database. The database manipulation is classified into two processes, i.e., "manipulation command" and "manipulation execution." The manipulation command is an update request of the database, and does not actually rewrite the contents. The actual rewrite process of the database is executed in the manipulation execution process. "Manipulation" will indicate "database manipulation" herein unless otherwise specified. If an object to be manipulated is other than a database, the object to be manipulated is specified like "interactive device manipulation by the user."

Note that the manipulation command may be generated by the user or by a process during an operation. As the former example, the manipulation command is generated when the user has moved a virtual object by manipulating an interactive device such as a mouse or the like. On the other hand, as the latter example, the manipulation command is generated when, e.g., a game program has algorithmically moved/rotated an enemy character in a shooting game system.

Figure 2:
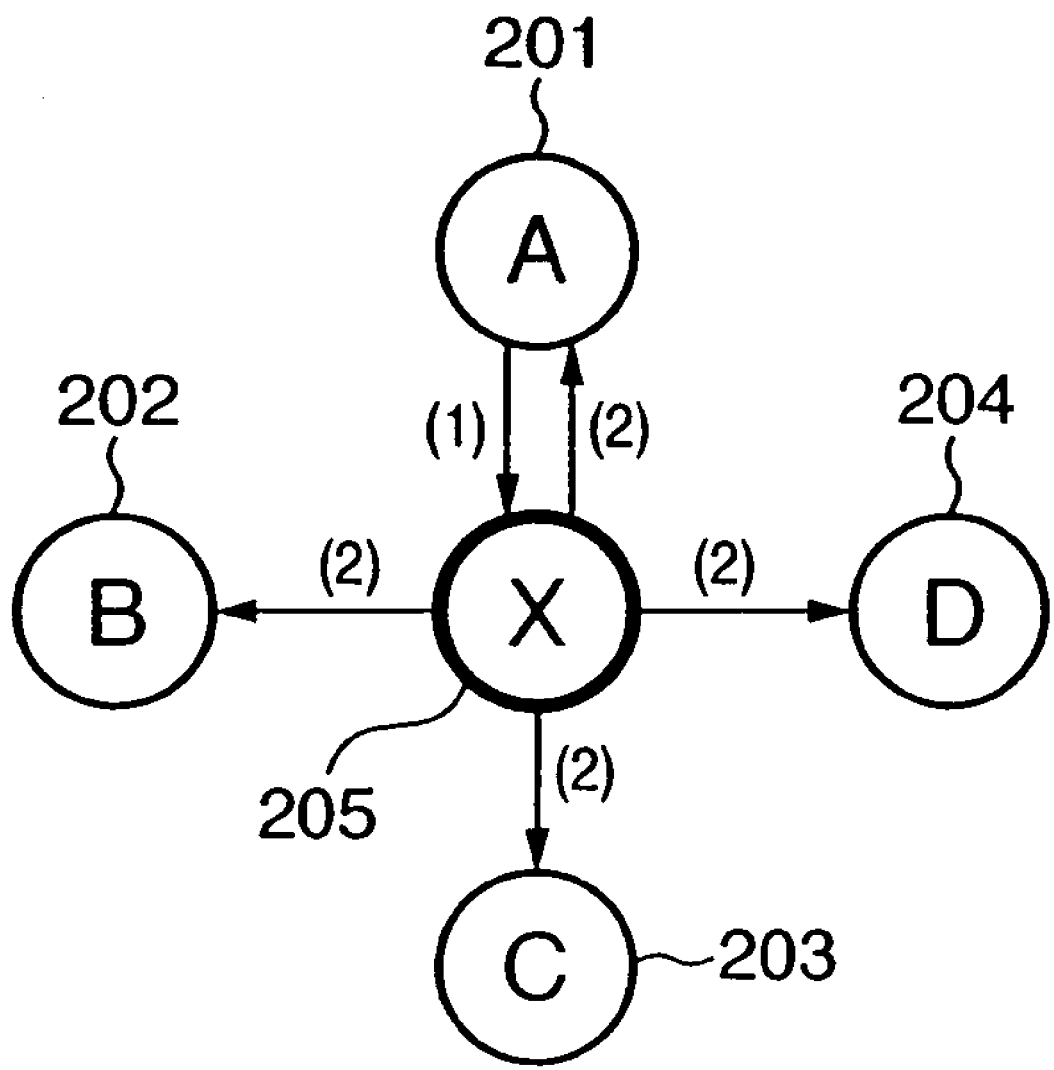
FIG. 2 shows a basic information transmission method among processes according to the first embodiment.

FIG. 2 shows the basic information flow upon updating databases. In FIG. 2, reference symbols A, B, C, and D (201 to 204) denote clients; and X (205), a server. Assume that client A (201) has generated a manipulation command of a scene database. The contents of the manipulation command are transmitted to the server via a network (a process indicated by arrow (1) in FIG. 2). Upon reception of this manipulation command, the server distributes data transmitted from client A (201) to all clients (a process indicated by arrow (2) in FIG. 2). Through these processes, non-manipulator clients B (202), C (203), and D (204) can also detect the manipulation contents.

Figure 3:
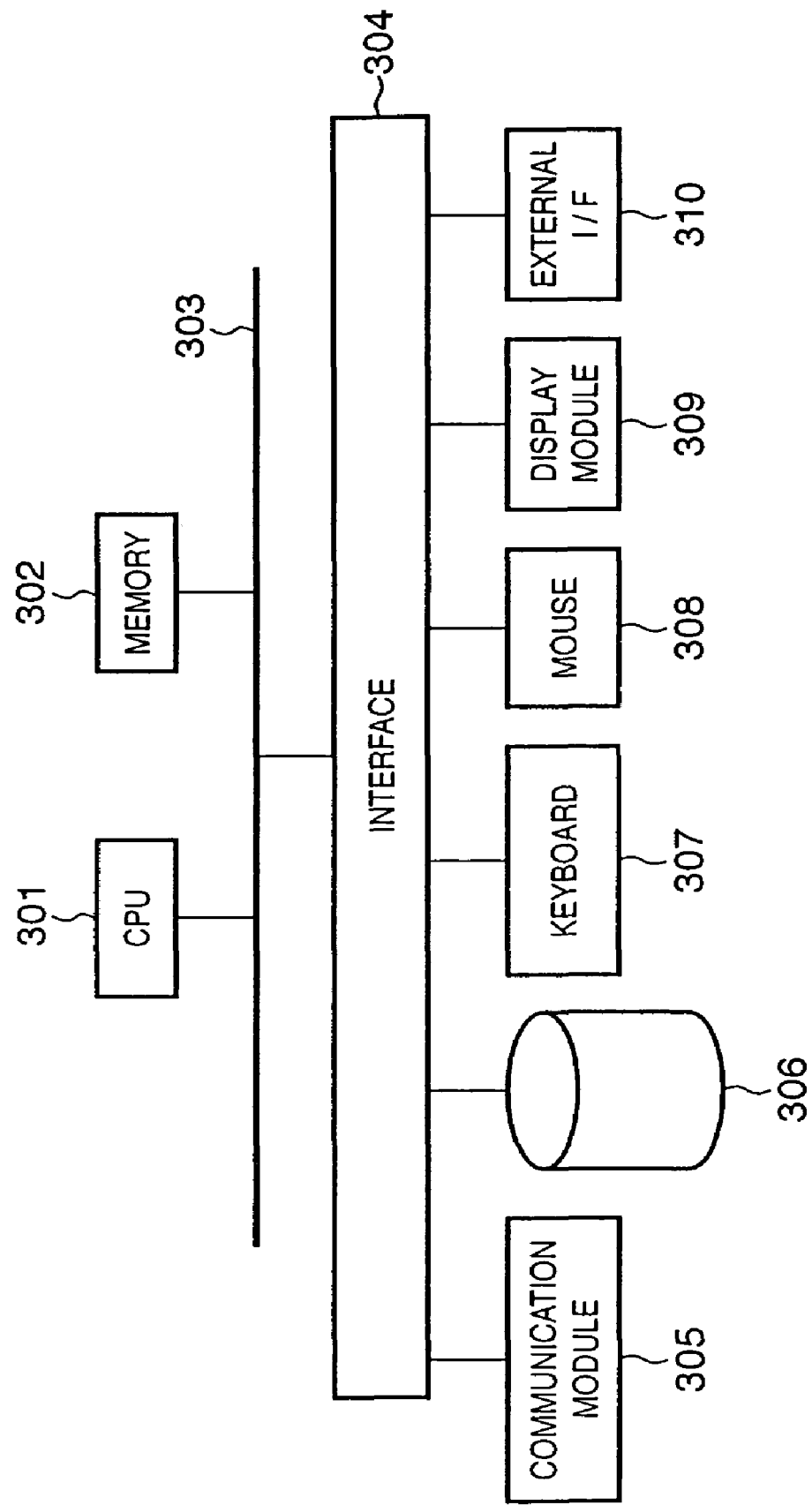
FIG. 3 is a block diagram showing the hardware arrangement of a terminal device according to the first embodiment.

An example of the arrangement of an information processing apparatus (terminal) on which the client or server process runs will be explained below using FIG. 3. Referring to FIG. 3, reference numeral 301 denotes a CPU which controls the operation of the overall terminal. Reference numeral 302 denotes a memory which stores programs and data used in operations of the CPU 301. Reference numeral 303 denotes a bus which transfers data among respective building modules. Reference numeral 304 denotes an interface between the bus 303 and respective devices. Reference numeral 305 denotes a communication module which is used to establish connection to the network; 306, an external storage device which stores programs and data to be loaded by the CPU 301; 307 and 308, a keyboard and mouse, which form an input device used to launch each program and to designate operations of that program; 309, a display module which displays the operation result of the process; and 310, an external interface (IF) module which exchanges data between the terminal and other external devices.

The system of this embodiment has the following three modes in association with the update timings of a database. These modes will be generically named as "update mode" hereinafter.

(1) Wait mode
(2) Immediate mode
(3) Delay mode

The respective modes will be described in detail below.

Figure 4:
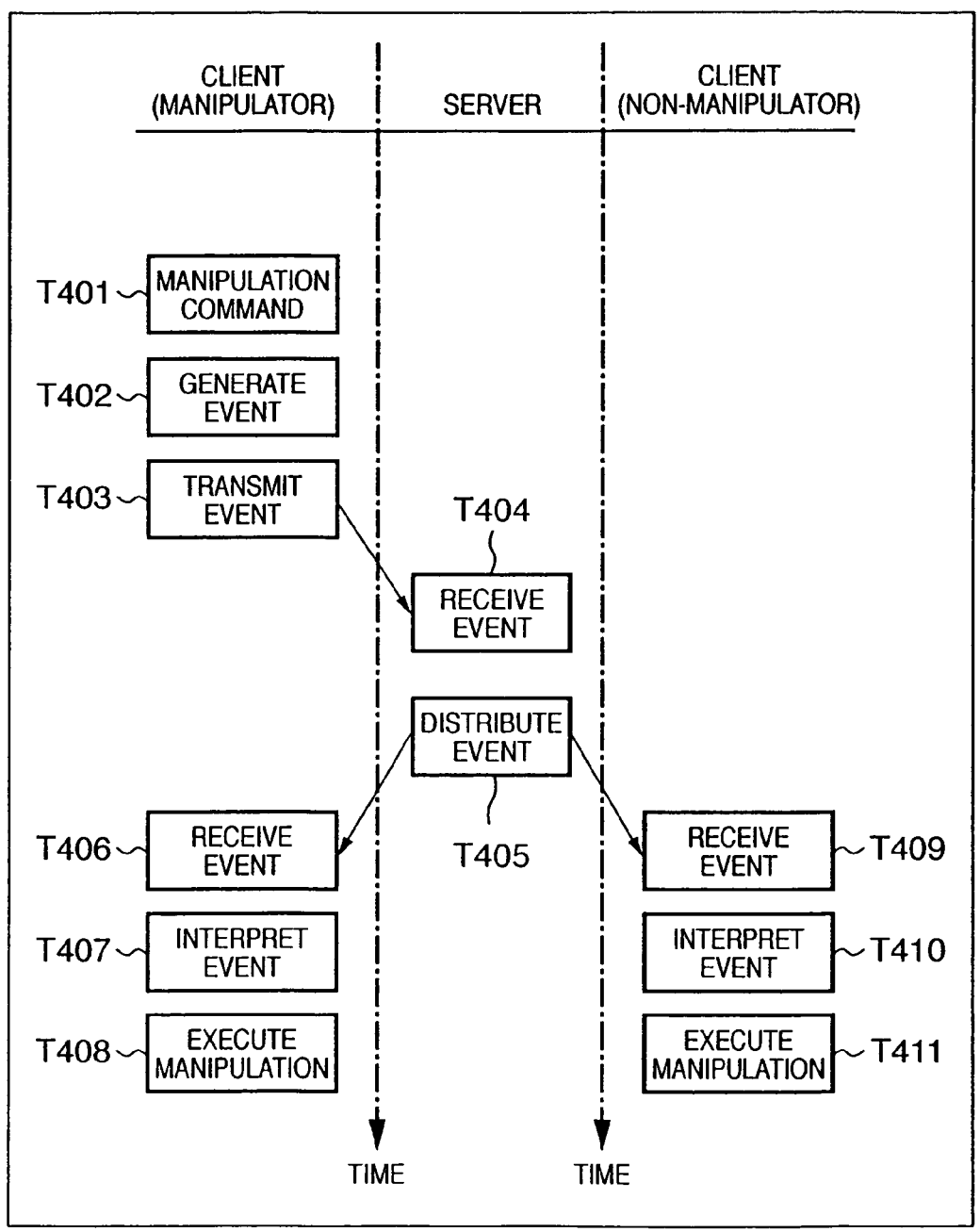
FIG. 4 is a chart showing the database update sequence in a wait mode.

In "wait mode," manipulation execution of a given manipulation command is made after waiting for distribution of an event from the server. FIG. 4 illustrates the processing sequence along with an elapse of time in the wait mode. In FIG. 4, "manipulator" indicates a client that has generated the manipulation command, and "non-manipulator" indicates a client other than the manipulator. The processes progress as follows.

In procedure T401, the manipulator client issues a manipulation command of a database. At this time, the database of the manipulator client is not updated. An event that indicates the manipulation contents in procedure T401 is generated in procedure T402, and is transmitted to the server in procedure T403. The server receives that event in procedure T404, and transmits the event to all clients which have established connection to the server in procedure T405 (establishment of connection will be explained later in step S1102 in FIG. 11). The manipulator client receives the event issued by the server in procedure T406, interprets the contents of the event (T407), and rewrites the database (T408). The same procedures after reception of the event apply to each non-manipulator client (procedures T409 to T411). As shown in FIG. 4, in the wait mode a time lag is generated from the manipulation command (T401) until the manipulation execution (T408). However, if information is transferred on the network under the same condition, it is expected that both manipulator and non-manipulator clients update their databases at nearly the same time, and images on the virtual space are synchronized among the clients.

Figure 5:
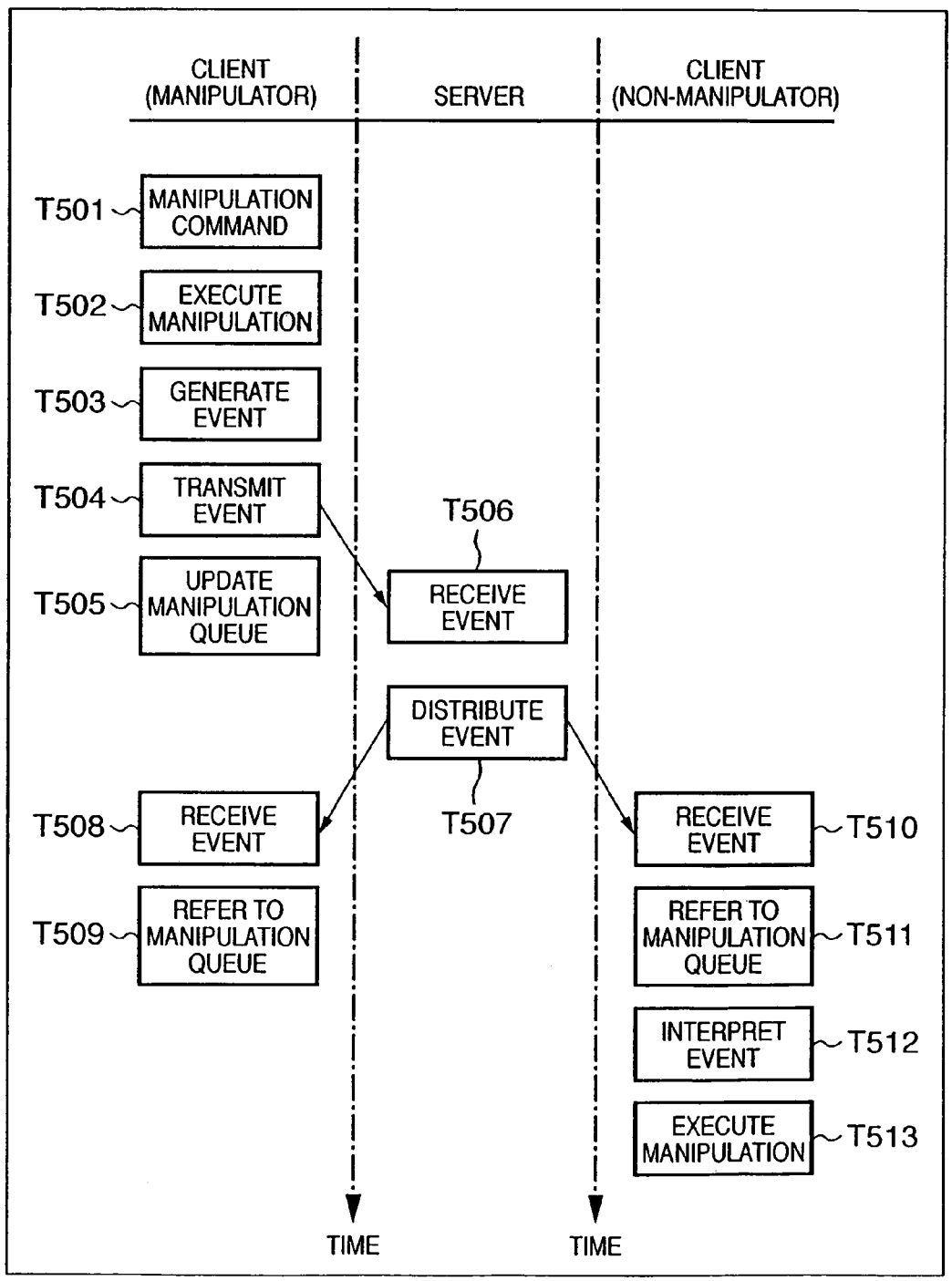
FIG. 5 is a chart showing the database update sequence in an immediate mode.

In "immediate mode," a manipulator's command is immediately reflected on the database, and a non-manipulator's database is updated behind that update timing. FIG. 5 illustrates the processing sequence along with an elapse of time in the immediate mode. The processes progress as follows.

In procedure T501, the manipulator client issues a database manipulation command. In procedure T502, the database is updated in accordance with the contents of the manipulation command. After that, an event indicating the manipulation contents is generated (T503), and is transmitted to the server (T504). After event transmission, the manipulator client holds information indicating the manipulation command in procedure T501 and its execution in a manipulation queue (T505 and "manipulation queue" will be described later).

The server receives the event in procedure T506, and transmits that event to all clients in procedure T507. Upon reception of the event from the server in procedure T508, the manipulator client refers to the manipulation queue (T509). Since the manipulator client recognizes based on the information recorded in procedure T505 that the manipulation has already been executed, it skips the manipulation execution process, and deletes the information recorded in procedure T505.

On the other hand, each non-manipulator client recognizes with reference to its manipulation queue that the event received in procedure T510 has not been executed yet (T511), and executes the manipulation on the basis of the event contents (T512, T513).

When the databases are updated in the aforementioned sequence, the time delay produced until the manipulator client reflects the manipulation result for the virtual space on a CG image can be shorter than in the wait mode. Therefore, the immediate mode is mainly suitable for a case wherein the user manipulates a virtual object using an interactive device. This is because if any time difference is generated between the user's interactive manipulation and presentation of its result, problems (e.g., making manipulations harder, making the user uncomfortable, and so forth) are normally posed.

Figure 6:
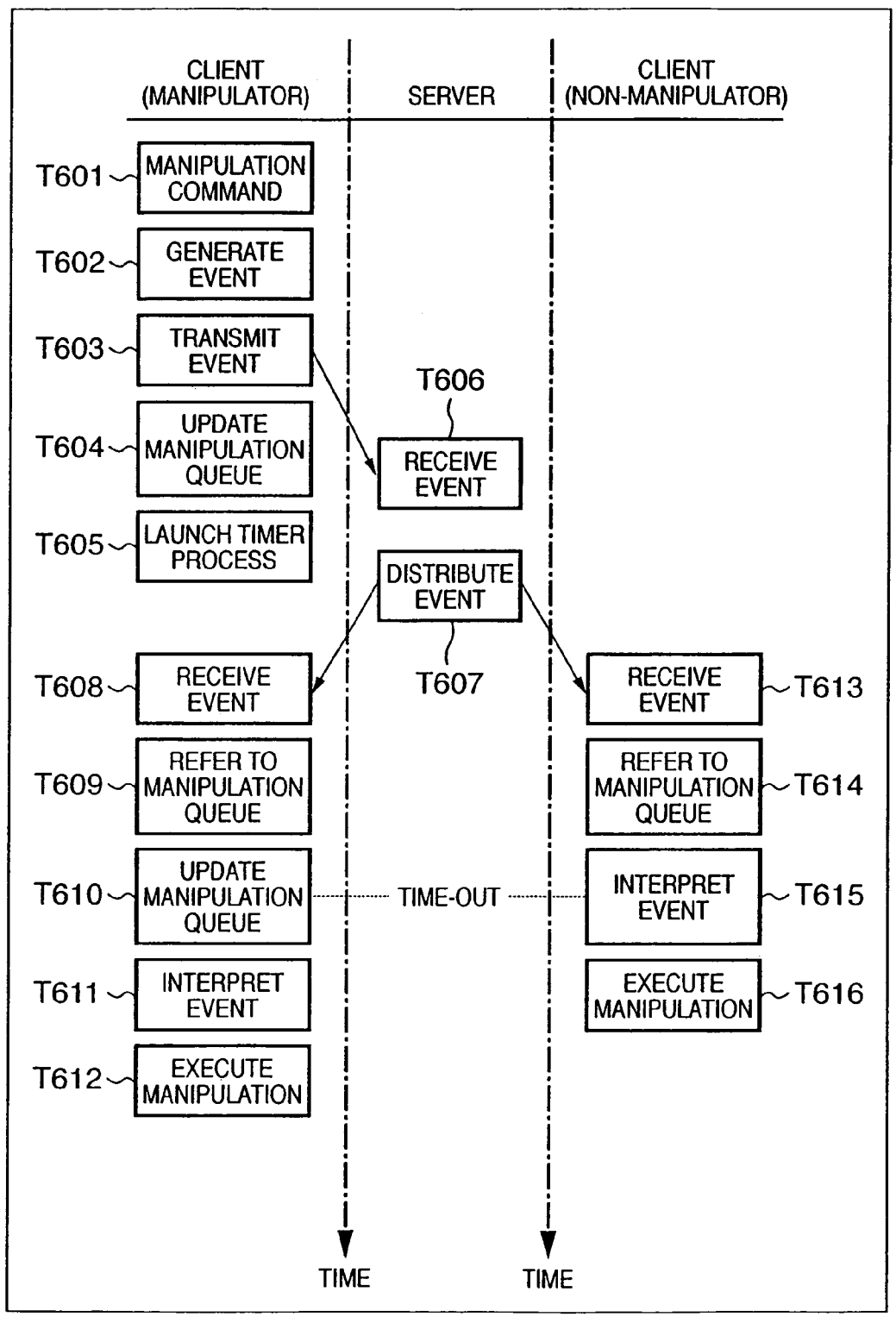
FIG. 6 is a chart showing the database update sequence in a delay mode (when a time-out is not generated)

In the "delay mode," the manipulation command is not immediately executed unlike in the wait mode, but a manipulation execution time limit is set, and the manipulation is executed without waiting for an event sent back from the server if the manipulation execution time limit has been reached. FIG. 6 illustrates the processing sequence along with an elapse of time when an event comes from the server before the manipulation execution time limit is reached in the delay mode. The processes progress as follows.

In procedure T601, the manipulator client issues a database manipulation command. At this time, the database is not updated. An event indicating the contents of the manipulation in procedure T601 is generated in procedure T602, and is transmitted to the server in procedure T603. After event transmission, the manipulator client holds information indicating issuance of the manipulation command in procedure T601 in a manipulation queue (T604 and "manipulation queue" will be described later), and launches a timer process (T605). The timer process executes the manipulation if a time-out is generated, and details thereof will be described later using FIG. 19.

The server receives the event in procedure T606, and transmits the event to all clients in procedure T607. The manipulator client receives the event in procedure T608 and refers to the manipulation queue (T609). Since the manipulator client recognizes that the manipulation has not been executed yet, it records information indicating that the manipulation has already been executed in the manipulation queue (T610), interprets the contents of the event (T611), and rewrites the database (T612). Furthermore, the manipulator client deletes information recorded in procedure T604. Also, each non-manipulator client recognizes that the event received in procedure T613 has not been executed yet (T614), and executes the manipulation based on the event contents (T615, T616).

Figure 7:
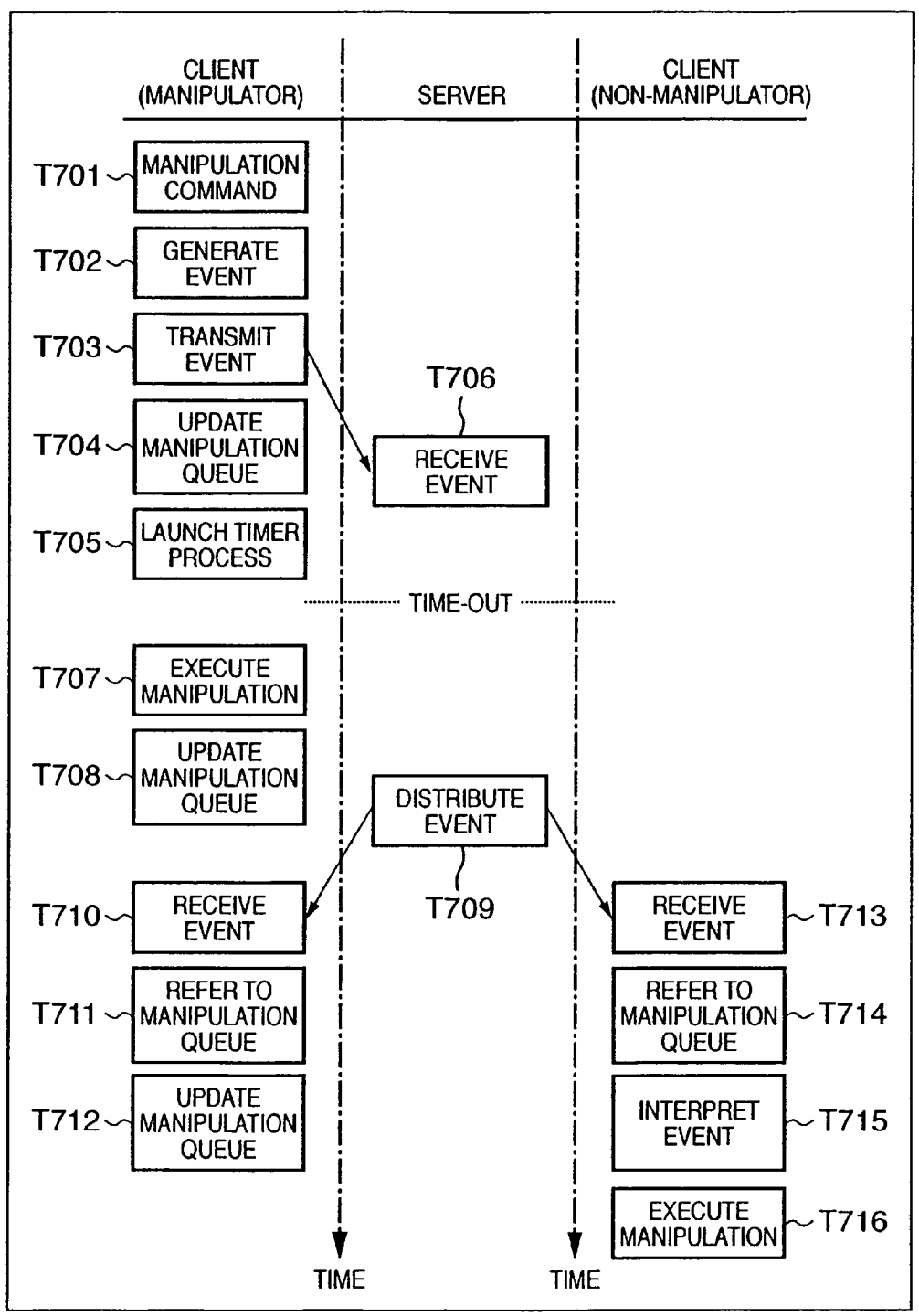
FIG. 7 is a chart showing the database update sequence in a delay mode (when a time-out is generated)

On the other hand, FIG. 7 illustrates the processing sequence along with an elapse of time when the manipulation execution time limit (time-out) is reached before an event comes from the server in the delay mode. The processes progress as follows.

In procedure T701, the manipulator client issues a database manipulation command. At this time, the database is not updated. An event indicating the contents of the manipulation in procedure T701 is generated in procedure T702, and is transmitted to the server in procedure T703. After event transmission, the manipulator client holds information indicating issuance of the manipulation command in procedure T701 in a manipulation queue (T704 and "manipulation queue" will be described later), and launches a timer process (T705). The timer process executes the manipulation if a time-out is generated, and details thereof will be described later using FIG. 19. On the other hand, the server receives the event in procedure T706, and transmits the event to all clients in procedure T709.

If the time-out time is reached before a corresponding event is received from the server, it is detected in the timer process, and the manipulator client executes the manipulation in procedure T707 and stores information indicating that the manipulation has already been executed in the manipulation queue (T708). Therefore, although the manipulator client receives the event in procedure T710, it recognizes with reference to the manipulation queue that the manipulation has already been executed (T711), and does not execute that manipulation. Each non-manipulator client recognizes that the event received in procedure T713 has not been executed yet (T714), and executes the manipulation based on the event contents (T715, T716).

When the databases are updated in the aforementioned sequence, if a time lag upon event distribution is large, operations are made to minimize the delay time period before the manipulation execution; and if the time lag is small, operations are made to synchronize clients. Such operations are automatically switched, and which of operations are dominant can be adjusted by appropriately setting the time-out time.

This embodiment further executes processes corresponding to a flushing event mode and synchronizing event mode so as to guarantee the order of manipulation execution and manipulation command issuance in association with the aforementioned wait mode and delay mode. These processes will be explained later.

Figure 8A:
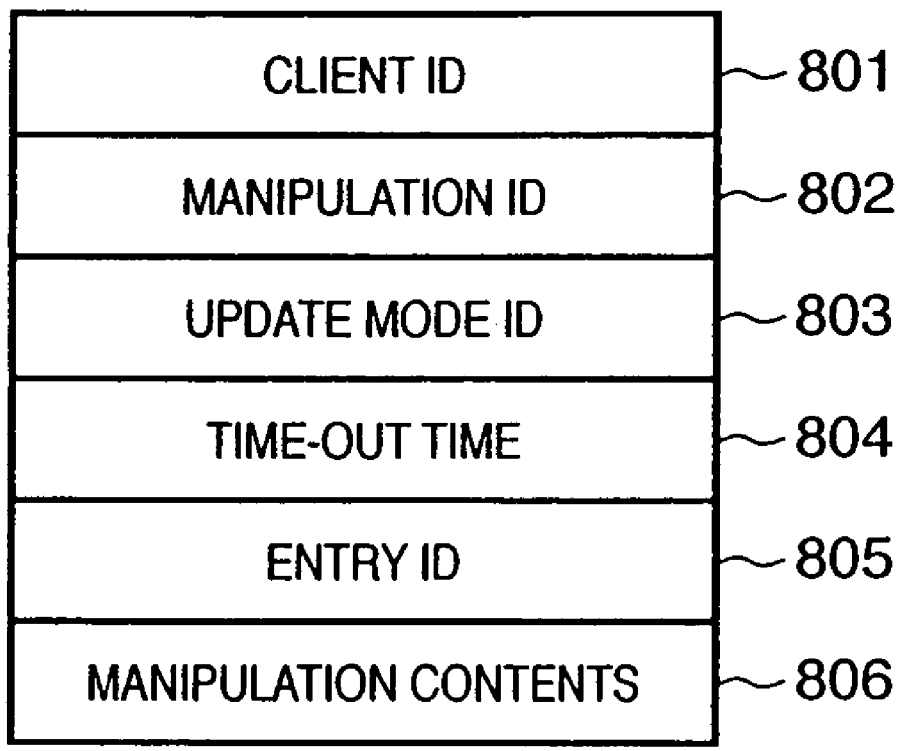
FIGS. 8A and 8B show an example of the data configuration of event data.

FIG. 8A shows the contents of an event issued from the client to the server, or from the server to the client. Event data is made up of a plurality of fields. A client ID field 801 stores a number which is used to uniquely identify each client and is assigned by the server when the client establishes network connection to the server (to be described later in step S1102 in FIG. 11). A manipulation ID field 802 stores a number which is used to uniquely identify a manipulation, and is assigned when a manipulation command is issued at each client. Using the pair of data in the client ID field 801 and manipulation ID field 802, all manipulation commands that have been issued in the system can be uniquely specified.

An update mode ID field 803 stores an identification number which is uniquely determined for each update mode, and is determined by an update mode of a manipulation command corresponding to this event. Since the update modes are set and registered in each entry of the database (to be described later using FIG. 21), the update mode is set with reference to that entry. Note that one of the aforementioned wait mode, delay mode, and immediate mode is set in the update mode ID field 803.

A time-out time field 804 is used in the aforementioned delay mode, and describes a time calculated by adding a delay time period to an event generation time. An entry ID field 805 stores a number which is used to uniquely identify each entry of the database, and is assigned upon loading data from a file. A manipulation content field 806 stores the detailed contents of a manipulation command. For example, when a manipulation for setting the X-coordinate of a CG object to a given value is made, this field stores a set of a number that identifies an X-coordinate property, and an X-coordinate setting value.

Figure 8B:
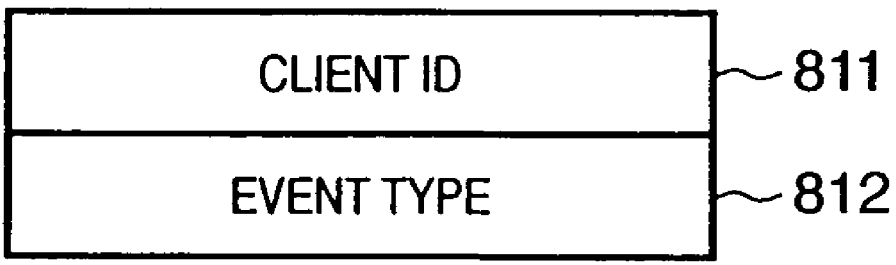

FIG. 8B shows the data configuration of a synchronizing event and flushing event. This event includes a client ID field 811 and an event type field 812 which stores an event type (flushing or synchronizing).

The manipulation queue will be described below. The manipulation queue is a list of manipulation commands which wait for reception of events or execution processes. If there are m manipulation commands in the waiting state at an arbitrary time, the manipulation queue is formed by listing up m pieces of information (queue items) associated with manipulation commands in the order the commands are scheduled to be generated, as shown in FIG. 9.

Figure 10A:
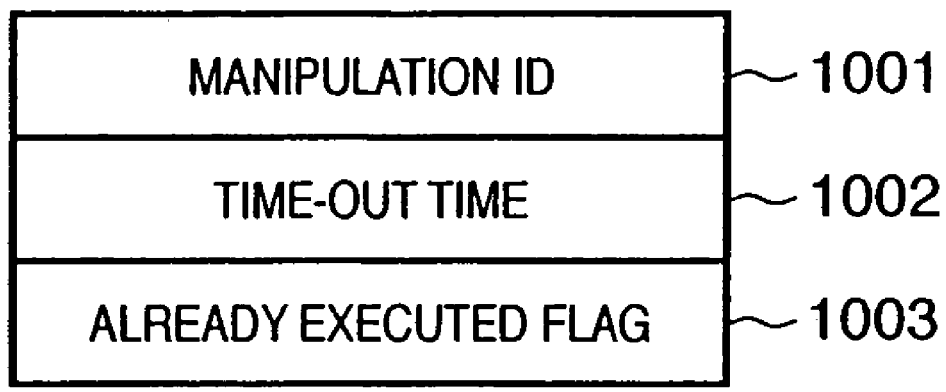
FIGS. 10A and 10B show an example of the data configuration of a manipulation queue item.

The contents of one queue item are formed of three data fields, as shown in FIG. 10A. A manipulation ID field 1001 stores a number which is used to uniquely identify a manipulation, and has the same value as that of the manipulation ID field of the corresponding event. The value of the manipulation ID field 1001 is assigned when a manipulation command is issued at each client. A time-out time field 1002 stores a manipulation execution time limit in the delay mode, and this time limit is calculated by adding a predetermined time-out time to the current time when a manipulation command is issued at each client. An already executed flag field 1003 indicates if a manipulation having that manipulation ID has already been executed in the immediate or delay mode. The already executed flag is set to OFF when a manipulation command is issued, and is changed to ON when the manipulation is executed.

Figure 10B:
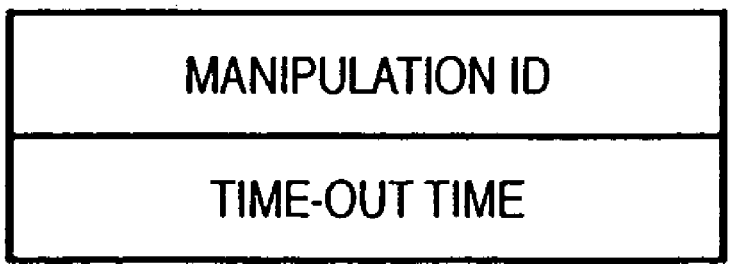

Note that FIG. 10A shows the manipulation queue item having three fields. Alternatively, the already executed flag and time-out time may be combined. In this case, when the time-out time assumes a special value (e.g., −1), such case may be defined to indicate that the manipulation has already been executed. FIG. 10B shows the data configuration of the manipulation queue item in such case.

Flushing and synchronizing of an event will be described below. The user can issue a flushing or synchronizing event from a terminal at a desired timing.

Flushing of events will be explained first. In the wait or delay mode, a time lag is generated from when the manipulator client issues a manipulation command until the manipulation is executed. For example, assume that there are two, i.e., first and second successive manipulations, and the second manipulation is to be executed only when the first manipulation result meets a given condition. After the first manipulation command is issued, when the second manipulation command is issued while the first manipulation has not been executed yet, since the first manipulation result is not reflected on the database at that time, the first manipulation result cannot be correctly referred to, and the second manipulation may not be normally executed. For this reason, after the first manipulation command is issued, the control must wait until the first manipulation command is executed, and must issue the second manipulation command after execution of the first manipulation command. That is, before the second manipulation command, all events, which have been issued so far but have not been executed yet, need be set in an already executed state. A process for setting all events that have been issued until the current time in an already executed state will be referred to as "flushing events" hereinafter.

Figure 22:
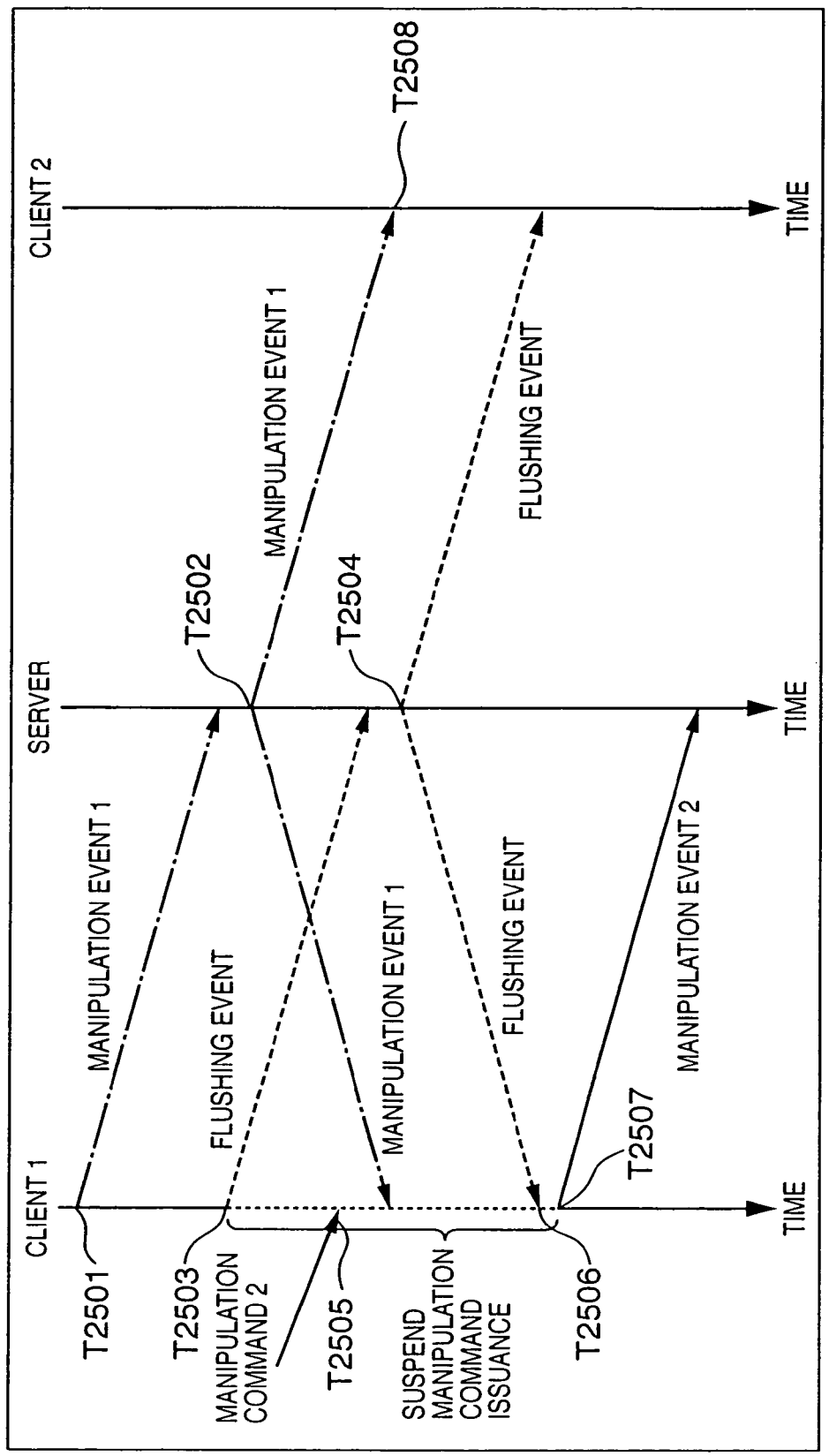
FIG. 22 is a chart for explaining an event flushing sequence.

The flushing event process in the wait mode will be described below. FIG. 22 shows the event flushing sequence. In FIG. 22, two clients are connected to one server. In procedure T2501, client 1 issues a database manipulation command, and transmits a manipulation event indicating the manipulation contents to the server. At this time, the manipulation result in procedure T2501 is not reflected on the database of client 1. The server receives manipulation event 1 in procedure T2502, and transmits manipulation event 1 to clients 1 and 2.

On the other hand, the user instructs at client 1 to issue a flushing event prior to input of manipulation command 2 which is influenced by the manipulation execution result of manipulation command 1. This operation is made to ensure issuance of manipulation command 2 after manipulation execution of manipulation command 1. Based on this instruction, a "flushing event" is generated in procedure T2503, and is transmitted to the server. In addition, issuance of manipulation commands is suspended (to set a manipulation command issuance suspension state).

In procedure T2504, the server receives the flushing event, and transmits the flushing event to clients 1 and 2. At this time, the server handles the flushing event in the same manner as a normal manipulation event. That is, the server transmits the received flushing event to all clients which have established connection to the server as well as the source client.

Client 1 makes an attempt to issue manipulation command 2 in procedure T2505 but cannot issue that command at that time, since issuance of manipulation commands has already been suspended in procedure T2503. At this time, client 1 adds manipulation command 2 to a manipulation command issuance queue (not shown; "manipulation command issuance queue" will be described later).

Client 1 executes the manipulation as soon as it receives manipulation 1 from the server. Upon reception of the flushing event from the server in procedure T2506, client 1 refers to the client ID field 801 (see FIGS. 8A and 8B) in data of the flushing event. As a result, if it is determined that the received flushing event was transmitted by client 1, client 1 cancels manipulation command issuance suspension. Upon canceling the manipulation command issuance suspension, client 1 refers to the manipulation command issuance queue, and sequentially issues manipulation commands registered in that manipulation command issuance queue (procedure T2507). In case of FIG. 22, manipulation command 2 designated in T2505 is issued, and is transmitted to the server. Client 2 receives the flushing event in procedure T2508. However, since this flushing event was not transmitted by client 2, it is discarded.

As described above, when a given client issues an arbitrary manipulation command, and then issues (transmits to the server) a flushing event, issuance of manipulation commands is suspended after transmission of the flushing event until the issued flushing event is received from the server. In this way, after the previous manipulation command is surely set in an already executed state, the next manipulation command can be issued.

When the update mode is the immediate mode, since a manipulation command is issued as soon as it is issued, the event flushing sequence is not required.

When the update mode is the delay mode, if the time-out time is reached after issuance of manipulation commands is suspended in procedure T2503 before the flushing event is received from the server, the manipulation command issuance suspension state is canceled at that time, and registered events are issued with reference to the manipulation command issuance queue. When the manipulation has not been executed yet at that time, that manipulation is immediately executed, as has been described above in the description of the delay mode.

Synchronizing of events will be explained below. By synchronizing events, the manipulation order is guaranteed in all connected clients. A time lag is generated from when the manipulator client issues a manipulation command until each non-manipulator client executes the manipulation. For example, assume that there are two, i.e., first and second successive manipulations, the first manipulation command is to be issued by client 1, the second manipulation command is to be issued by client 2, and the second manipulation is to be executed only when the first manipulation result meets a given condition. Also, assume that after client 1 has issued the first manipulation command, client 2 issues the second manipulation command although it has not executed the first manipulation yet. In this case, since the first manipulation result is not reflected on the database of client 2, client 2 cannot correctly refer to the first manipulation result and may not normally execute the second manipulation. As a result, the databases of these two clients may have different contents, thus losing consistency.

At the time of issuance of the second manipulation command at client 2, if client 1 has already executed the first manipulation, but client 2 has not executed that manipulation yet, client 1 can normally execute the second manipulation but client 2 cannot normally execute the second manipulation. For this reason, client 2 must wait until all clients execute the first manipulation, and must issue the second manipulation command after execution. That is, all unexecuted events issued by all clients must be flushed, and events issued after those events must be synchronized among all clients. This embodiment implements this process by issuing and managing a synchronizing event.

Figure 23:
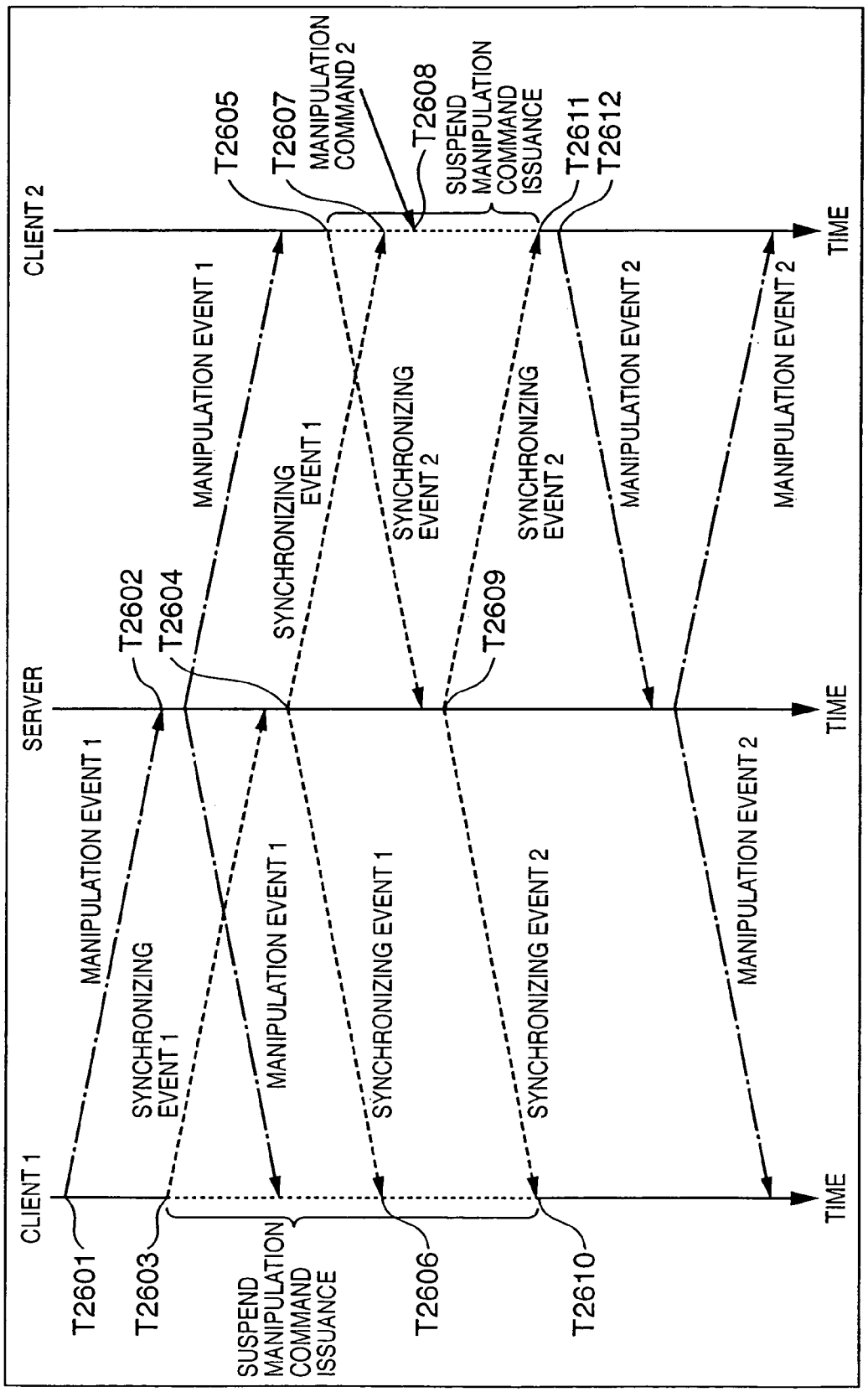
FIG. 23 is a chart for explaining an event synchronizing process.

FIG. 23 shows the event synchronizing sequence. In FIG. 23, two clients are connected to one server, client 1 executes manipulation 1, and client 2 executes manipulation 2 which is influenced by the execution result of manipulation 1. Assume that the user recognizes in advance that manipulation 2 to be executed by client 2 is influenced by manipulation 1 to be executed by client 1. FIG. 23 shows a state for synchronizing event issuance of clients 1 and 2.

In procedure T2601, client 1 issues a database manipulation command, and transmits an event indicating the manipulation contents to the server. At this time, the manipulation result in procedure T2601 is not reflected on the database of client 1, and a manipulation is to be executed upon reception of manipulation event 1 from the server later.

In procedure T2602, the server receives manipulation event 1, and transmits manipulation event 1 to clients 1 and 2. Since manipulation client 1 is followed by manipulation command 2, which is influenced by the manipulation result of the former command, the user of client 1 makes an operation for issuing a synchronizing event. With this operation, "synchronizing event 1" is generated and is transmitted to the server in procedure T2603. Then, issuance of manipulation commands at client 1 is suspended. This manipulation command issuance suspension state is canceled when client 1 receives from the server synchronizing events as many as the number of clients.

In procedure T2604, the server receives synchronizing event 1 transmitted by client 1, and transmits synchronizing event 1 to clients 1 and 2. At this time, the server handles the synchronizing event in the same manner as a normal manipulation event. Client 2 executes a manipulation event upon reception of that event.

On the other hand, the user of client 2 is to issue manipulation command 2 which is influenced by the manipulation execution result of manipulation command 1, and makes an operation of issuing a synchronizing event to achieve system synchronization. In procedure T2605 in FIG. 23, synchronizing event 2 is generated by this operation, and is transmitted to the server. Simultaneously with issuance of that synchronizing event, issuance of manipulation commands at client 2 is suspended. This guarantees that manipulation command 2 is issued after all clients have executed manipulation command 1.

Upon reception of manipulation event 1 transmitted from the server, client 1 also executes a corresponding manipulation. Also, client 1 receives synchronizing event 1 in procedure T2606. At this time, since the number of synchronizing events received so far is only one (i.e., only the event transmitted by client 1), the manipulation command issuance suspension state continues.

Client 2 receives synchronizing event 1 in procedure T2607. However, at that time, since the number of synchronizing events received so far is only one, the manipulation command issuance suspension state continues. Hence, even when client 2 makes an attempt to issue manipulation command 2 in procedure T2608, since issuance of manipulation commands has been suspended in procedure T2605, no manipulation command 2 is issued at that time. At this time, client 2 adds manipulation command 2 to a manipulation command issuance queue (not shown).

In procedure T2609, the server receives synchronizing event 2 issued by client 2, and transmits synchronizing event 2 to clients 1 and 2. In procedure T2610, client 1 receives synchronizing event 2 transmitted from the server. At this time, since client 1 has received a total of two synchronizing events transmitted by clients 1 and 2 so far, and the number of received synchronizing events is equal to the number of clients connected to the server, the manipulation command issuance suspension state is canceled. Upon canceling of the manipulation command issuance suspension state, the client refers to the manipulation command issuance queue, and processes (issues) a manipulation command registered in the manipulation command issuance queue if such command is found.

Likewise, client 2 receives synchronizing event 2 transmitted from the server in procedure T2611. Since client 2 has received two synchronizing events, the manipulation command issuance suspension state is canceled as in procedure T2610. In procedure T2612, client 2 refers to the manipulation command issuance queue, and issues a manipulation command registered in that queue. In this case, manipulation command 2 is issued, and manipulation event 2 is transmitted to the server.

In this manner, in the synchronizing event mode, all clients respectively issue synchronizing events, and each client receives synchronizing events as many as the number of clients (via the server). Each client suspends issuance of manipulation commands until it receives all synchronizing events. With this control, upon completion of reception of synchronizing events, all manipulation commands issued by all clients so far are reliably flushed.

Note that a synchronizing event is issued in response to a user's manipulation instruction, and each client always counts the number of synchronizing events received from the server. When the count value has reached a predetermined value (the number of clients which have established connection to the server in this case), the client cancels the manipulation command issuance suspension state, resets the count value, and restarts counting of the number of synchronizing events.

When the update mode is the delay mode, and the time-out time is reached before synchronizing events from all clients are received, the manipulation command issuance suspension state is canceled at that time.

Also, synchronization need not always be achieved among all clients connected to the server, and clients to be synchronized may be arbitrarily set. For example, upon generating data of a synchronizing event, the client identification numbers of clients to be synchronized are set in the manipulation content field 806 (FIGS. 8A and 8B). Upon receiving a synchronizing event, each client compares the client identification numbers set in the manipulation content field 806 with a number described in the client ID field 811 (FIG. 8B) of the synchronizing event, and cancels the manipulation command issuance suspension state upon reception of synchronizing events from clients with all the client identification numbers set in the manipulation content field 806. In this way, event issuance can be synchronized among arbitrary clients.

The manipulation command issuance queue will be described below. The manipulation command issuance queue is a list of manipulation commands which are waiting for event issuance, and has the same configuration as that of the manipulation queue shown in FIG. 9. That is, if there are m manipulation commands in the waiting state at an arbitrary time, the manipulation command issuance queue is formed by listing up m pieces of information (queue items) associated with manipulation commands in the order the commands are generated, as shown in FIG. 9. The manipulation command issuance queue can be implemented by the same means and configuration as those of the manipulation queue, since these queues are lists that store manipulation commands, although the manipulation queue and manipulation command issuance queue have some differences, i.e., the former is a list of manipulation commands which are waiting for reception of events or execution processes, but the latter is a list of manipulation commands which are waiting for issuance of events.

The processing flows of the client and server will be described in detail below.

Figure 11:
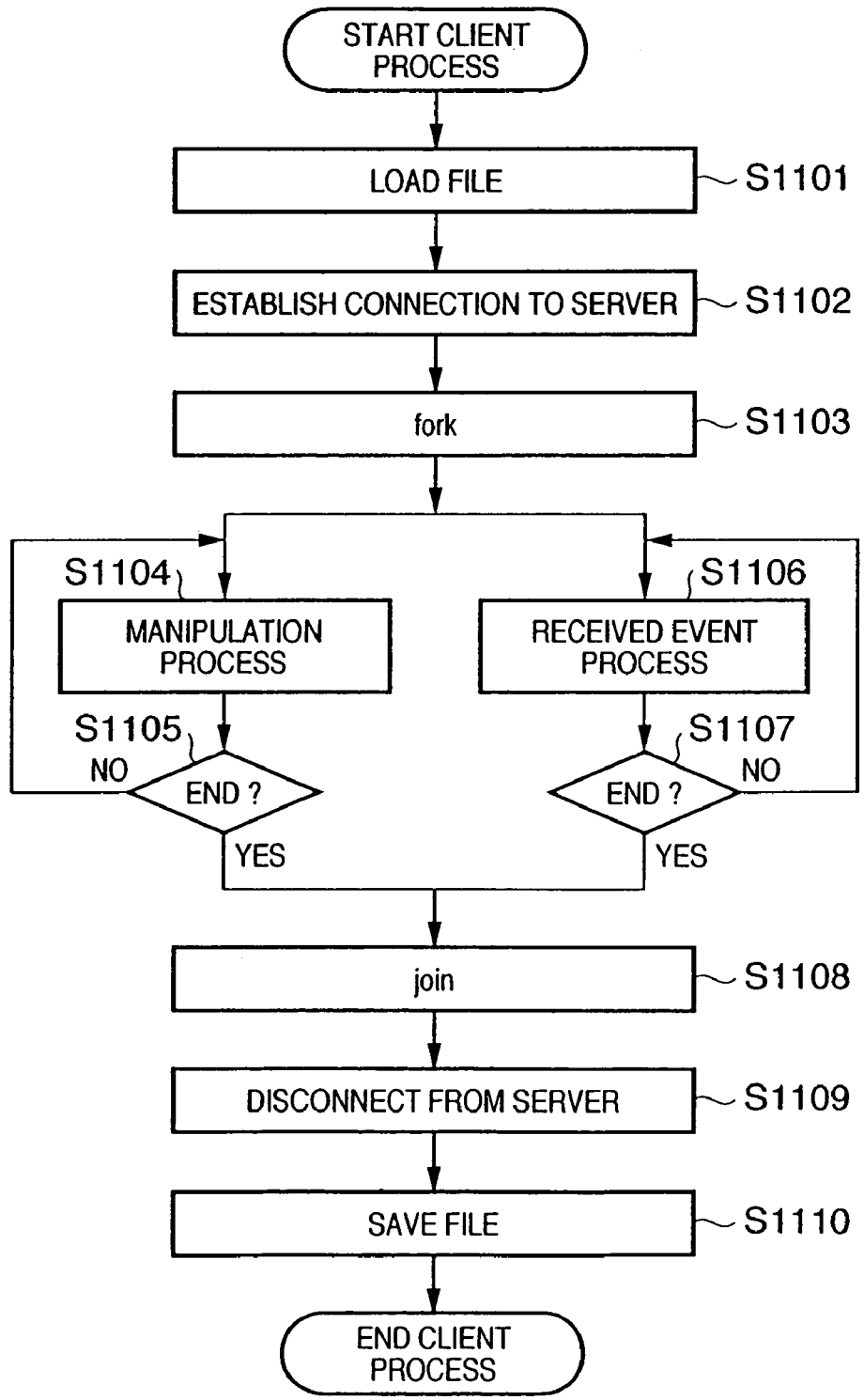
FIG. 11 is a flow chart showing a client process according to the first embodiment.

FIG. 11 shows the overall flow of the client process. When the client is started up, it loads a file that describes the virtual space from the external storage device 306 (FIG. 3) in step S1101 to build a scene graph database on the memory 302 (FIG. 3). In order to maintain data consistency among clients, the files to be loaded have the same contents among clients. The client establishes network connection to the server (step S1102). At this time, the server assigns a client ID which is used to identify each client. Note that data exchange between the client and server is attained by a one-to-one socket communication using the TCP/IP protocol. Therefore, the server has socket communication paths as many as at least the number of clients.

In step S1103, the process forks to launch a manipulation process (step S1104) for processing a manipulation command, and a received event process (step S1106) for processing an event received from the server. Note that a process for generating a CG image of the virtual space with reference to the scene graph database is also launched (not shown in FIG. 11). Since this process is the same as the known CG image generation method, a detailed description thereof will be omitted. The manipulation process and received event process will be described in detail later. In each of the manipulation process and received event process, it is checked in step S1105 or S1107 if a process end instruction is detected. If NO in step S1105 or S1107, the flow returns to step S1104 or S1106 to continuously process the manipulation command or received event. On the other hand, if YES in step S1105 or S1107, the processes are joined in step S1108. After network connection to the server is disconnected (step S1109), the contents of the database are saved as a file in the external storage device (306 in FIG. 3) (step S1110), thus ending all processes.

The manipulation process in step S1104 will be described in detail below with reference to FIGS. 12A and 12B. Initially, the contents of a manipulation command are input in step S1201. In this embodiment, if the user inputs a manipulation command in a state other than the manipulation command issuance suspension state, a process corresponding to that manipulation command is executed immediately. However, if the user inputs a manipulation command in the manipulation command issuance suspension state, that manipulation command is temporarily registered in the manipulation command issuance queue, and its process is executed after the manipulation command issuance suspension state is canceled.

Figure 12A:
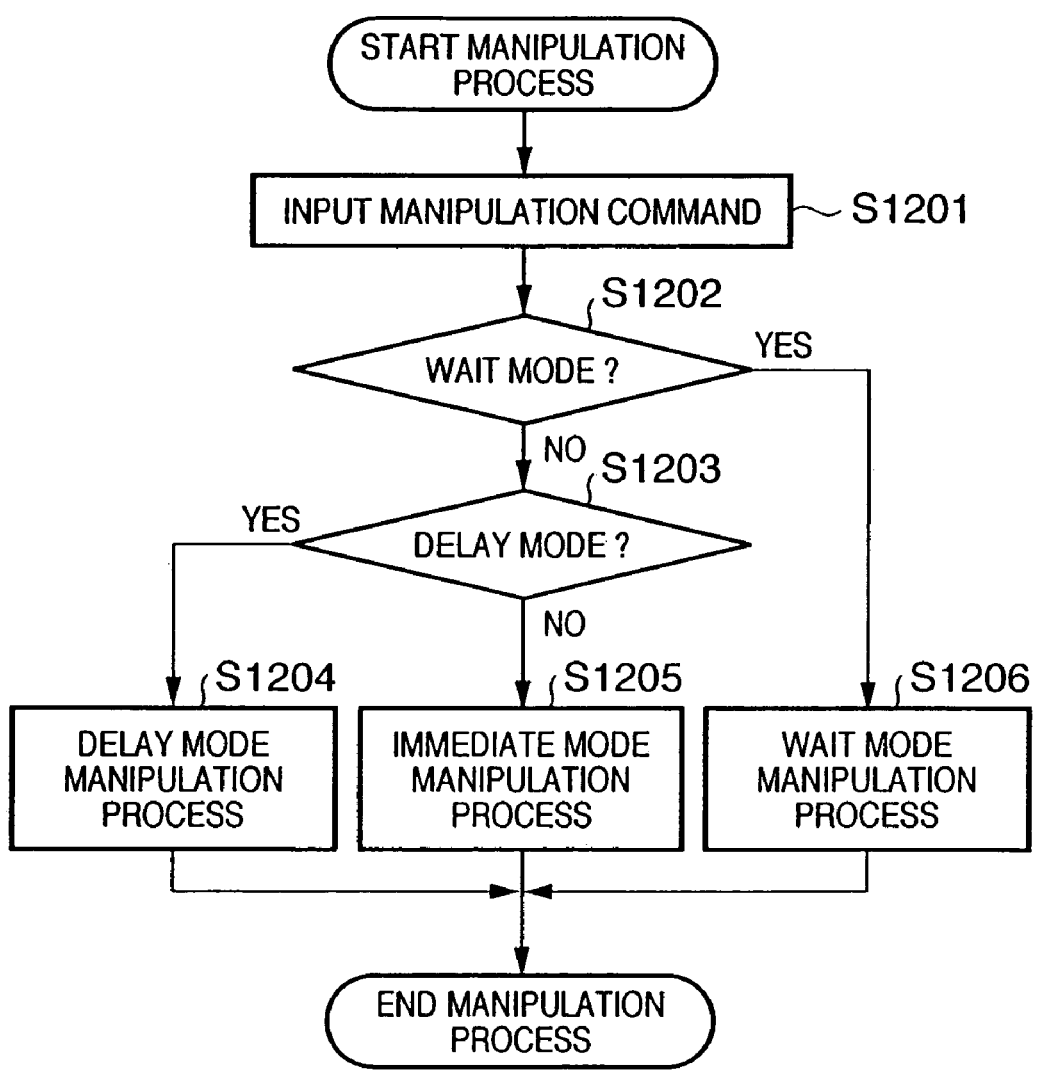
FIG. 12A is a flow chart showing a manipulation process in the client process.
Figure 12B:
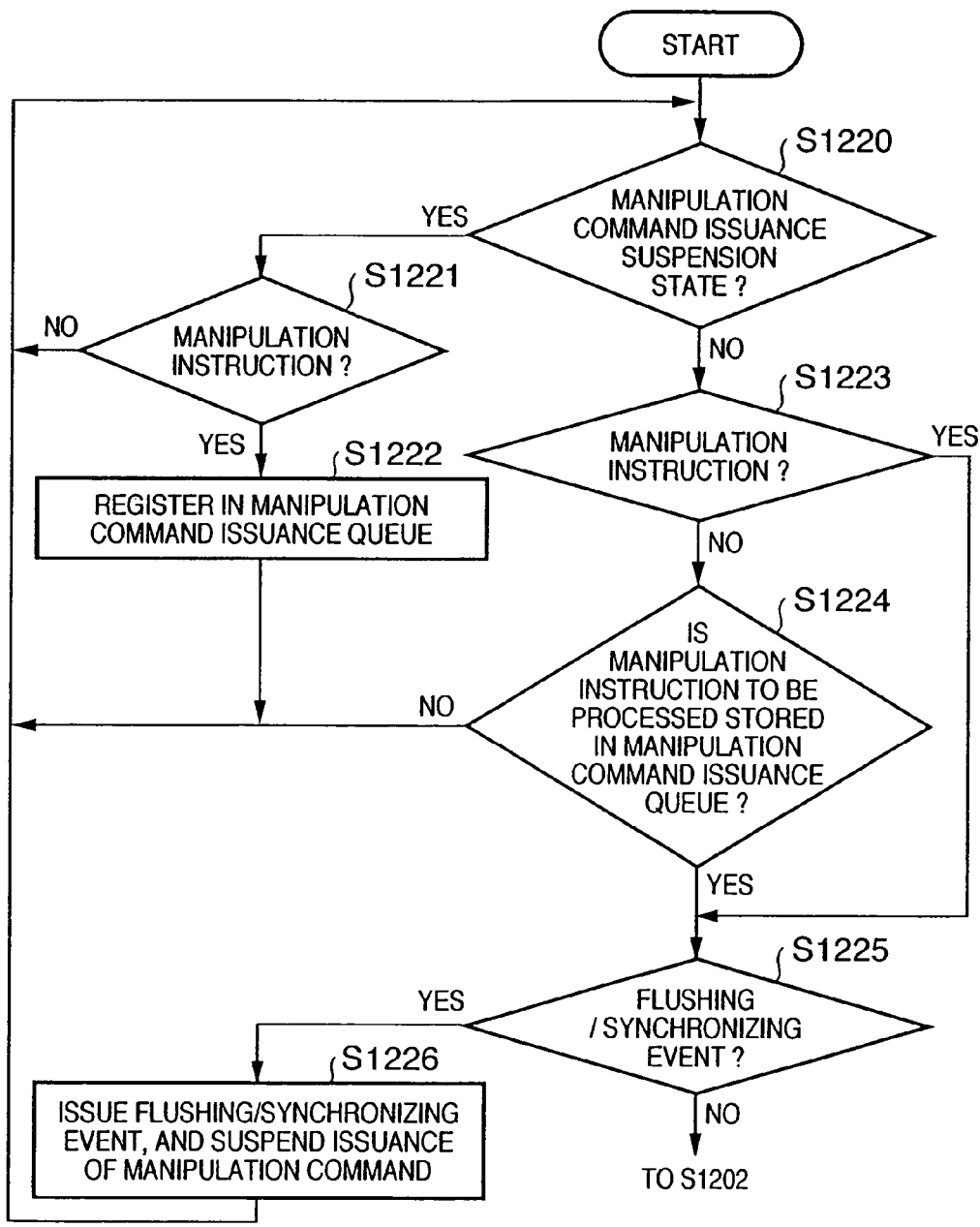
FIG. 12B is a flow chart for explaining a manipulation input process in FIG. 12A.

FIG. 12B is a flow chart for explaining a process corresponding to step S1201 in FIG. 12A in detail. if a manipulation instruction is input during the manipulation command issuance suspension state, that manipulation is registered in the manipulation command issuance queue (steps S1220, S1221, and S1222). On the other hand, if a manipulation instruction is input in a state other than the manipulation command issuance suspension state, it is checked if that manipulation instruction is an issuance instruction of a flushing or synchronizing event. If the manipulation instruction is not an issuance instruction of a flushing or synchronizing event, the flow advances to step S1202 (FIG. 12A). If the manipulation instruction is an issuance instruction of a flushing or synchronizing event, the flow advances to step S1226 to issue a corresponding event (a flushing or synchronizing event shown in FIG. 8B), and to set the manipulation command issuance state suspension state.

If no manipulation instruction is input in step S1223, the flow advances to step S1224 to check if a manipulation instruction to be processed is stored in the manipulation command issuance queue. If a manipulation instruction to be processed is stored, the flow advances to step S1225 to execute the same process as described above. If the manipulation command issuance queue is empty in step S1224, the flow returns to step S1220 to repeat the above process.

Referring back to FIG. 12A, an update mode is determined in steps S1202 and S1203 with reference to the entry of the database. After one of step S1206 (wait mode manipulation process), step S1205 (immediate mode manipulation process), and step S1204 (delay mode manipulation process) is executed depending on the update mode, the process ends.

The manipulation processes (steps S1204 to S1206) for respective update modes will be described in detail below with reference to FIGS. 13 to 15.

Figure 13:
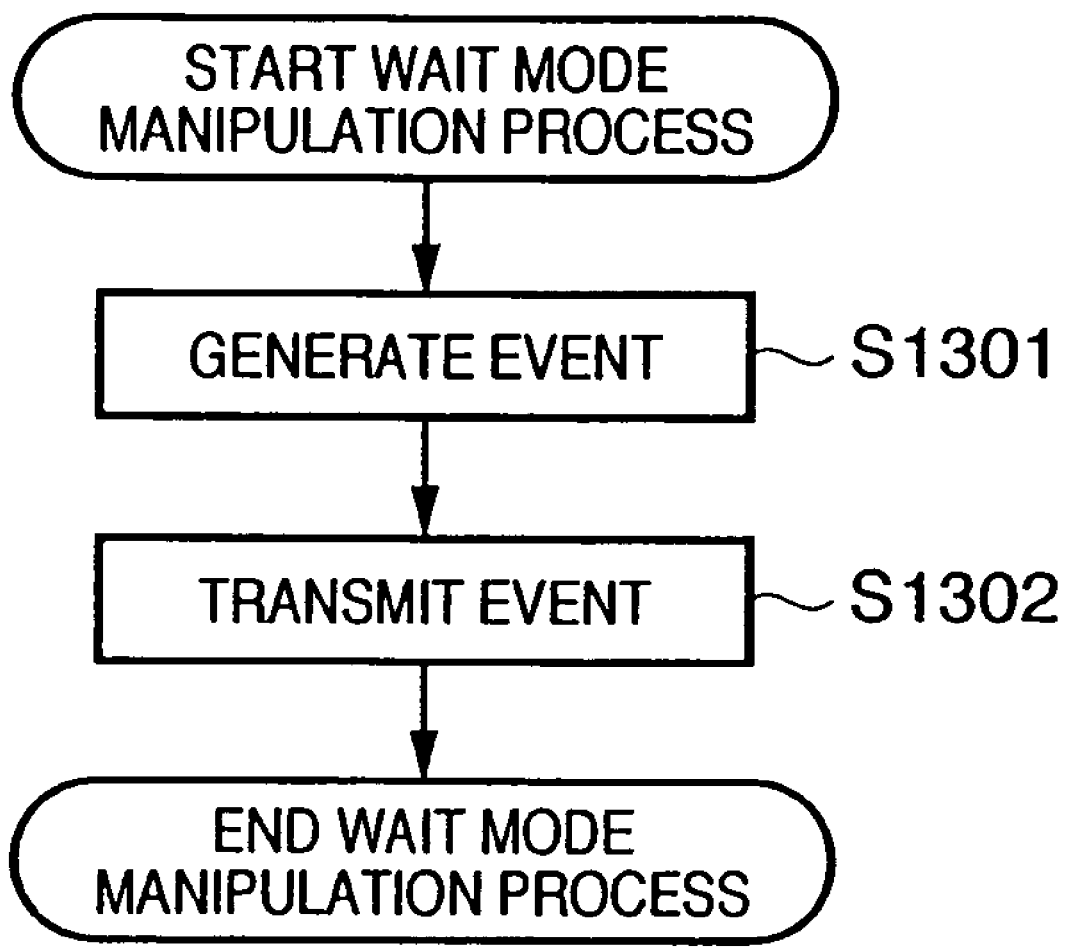
FIG. 13 is a flow chart for explaining a wait mode manipulation process in FIG. 12A.

FIG. 13 shows the flow of the wait mode manipulation process. In the wait mode manipulation process, a manipulation event corresponding to the manipulation command is generated in step S1301, and is issued in step S1302.

Figure 14:
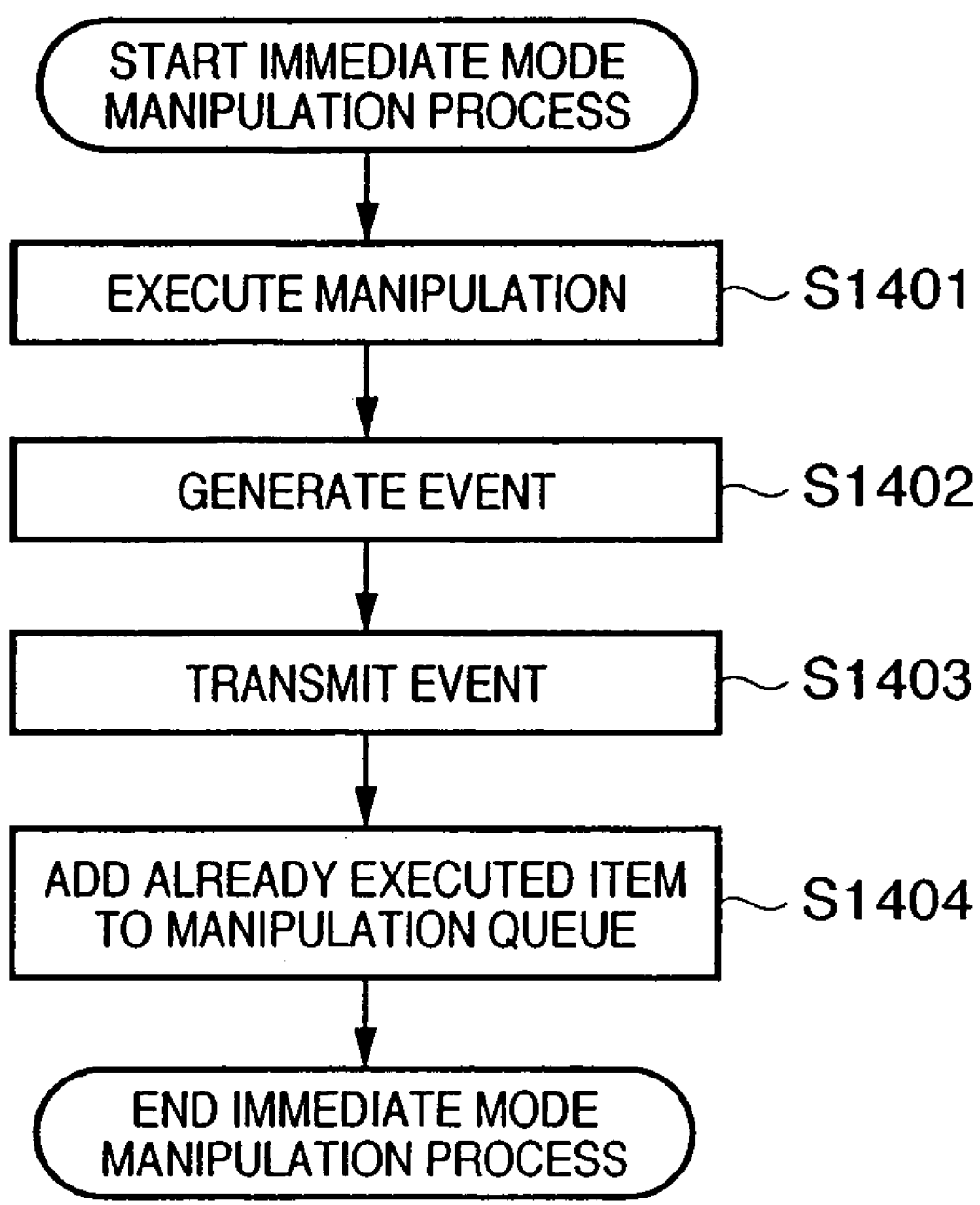
FIG. 14 is a flow chart for explaining an immediate mode manipulation process in FIG. 12A.
Figure 15:
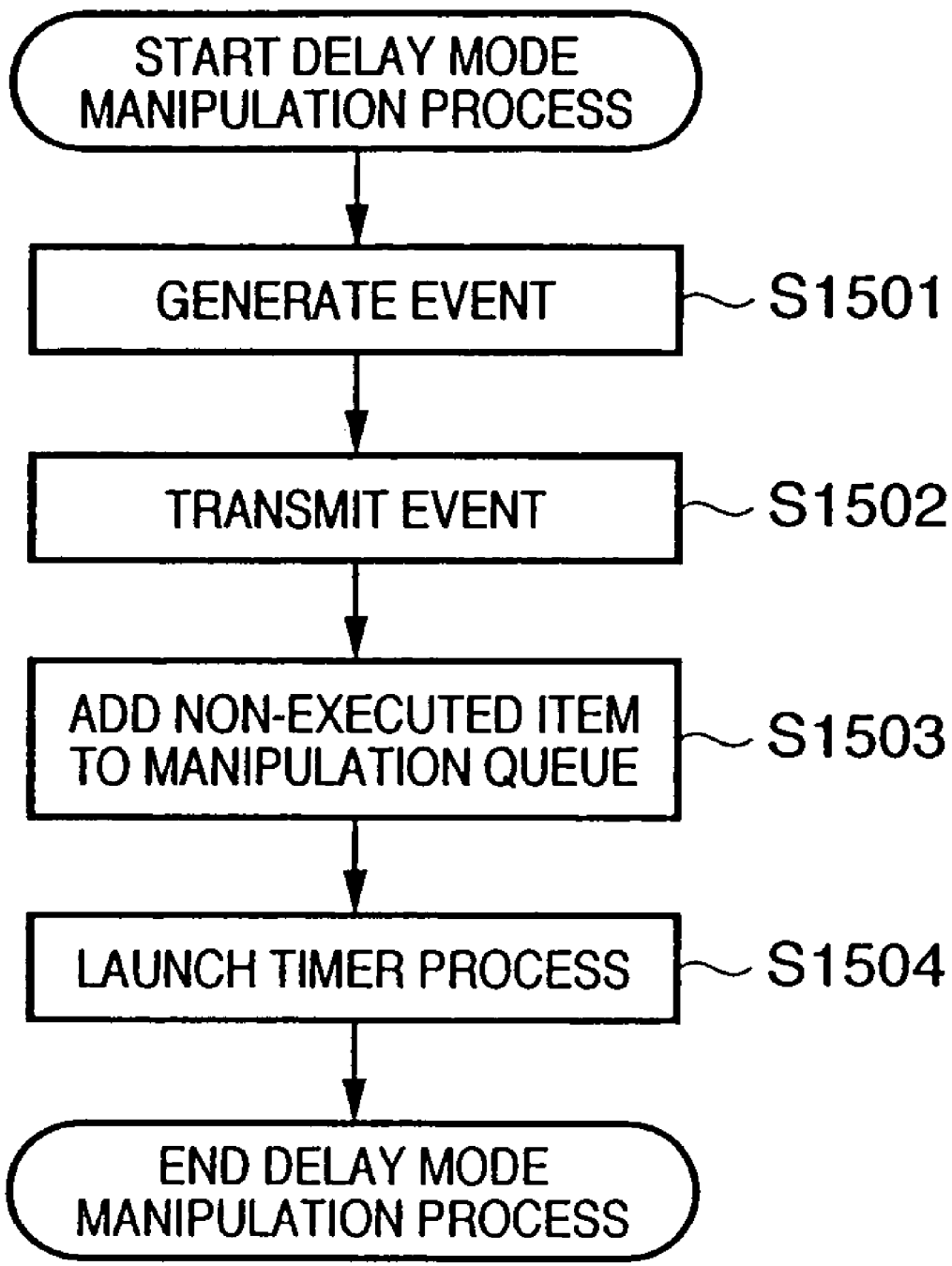
FIG. 15 is a flow chart for explaining a delay mode manipulation process in FIG. 12A.

The flow of the immediate mode manipulation process is as shown in FIG. 14. In step S1401, the manipulation command input in step S1201 is executed. More specifically, the setting value of the designated entry of the database is changed. Next, an event is generated (step S1402), and is sent to the server (S1403) as in the wait mode. Finally, in step S1404 a manipulation queue item in which the manipulation ID number determined in step S1201 is set in the manipulation ID field and the already executed flag is set to ON is added to the manipulation queue. At this time, since the time-out time is not used in the process, it can be arbitrarily set (e.g., 0).

The delay mode manipulation process will be described below using FIG. 15. An event is generated (step S1501) and is sent to the server (step S1502) as in the wait mode. A manipulation queue item (FIG. 9) in which the manipulation ID number determined in step S1201 is set in the manipulation ID field 1001, the sum of the current time and a predetermined time-out time is set in the time-out time field 1002, and the already executed flag is set to OFF is added to the manipulation queue (step S1503). Finally, a timer process is launched by passing the manipulation ID, manipulation contents, and time-out time data to it (step S1504). The timer process will be described in detail later.

Figure 16A:
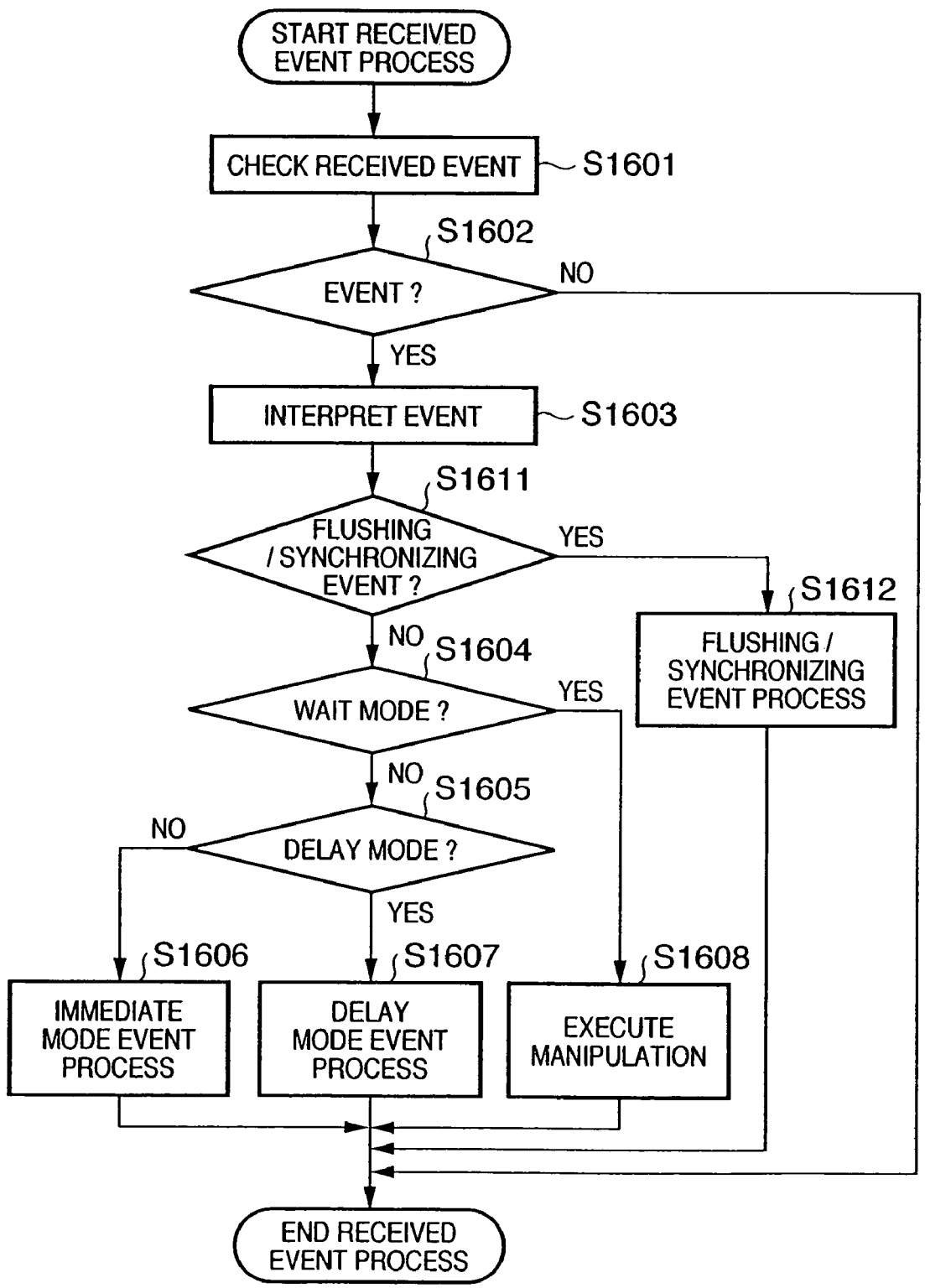
FIG. 16A is a flow chart showing a received event process in the client process shown in FIG. 11.

The received event process in step S1106 (FIG. 11) will be described in detail below. FIG. 16A shows the flow of the received event process. The received event is received from the server by an event communication module (not shown) and is input to a received event buffer.

In step S1601, the received event buffer is searched. It is checked in step S1602 if an event is input to the received event buffer. If a received event is found, the flow advances to step S1603. On the other hand, if it is determined that no received event is present, the process ends.

If a received event is found, that event data is interpreted to extract the contents of a manipulation command (step S1603). It is then checked in step S1611 if that event is a flushing or synchronizing event. If the event is a flushing or synchronizing event, the flow advances to step S1612 to execute the corresponding process. If the event is neither a flushing event nor a synchronizing event, the update mode of the manipulation command is determined with reference to the update mode ID field 803 of the event in steps S1604 and S1605. After one of step S1608 (in case of the wait mode), step S1606 (in case of the immediate mode), and step S1607 (in case of the delay mode) is executed in accordance with the determined update mode, the process ends.

Figure 16B:
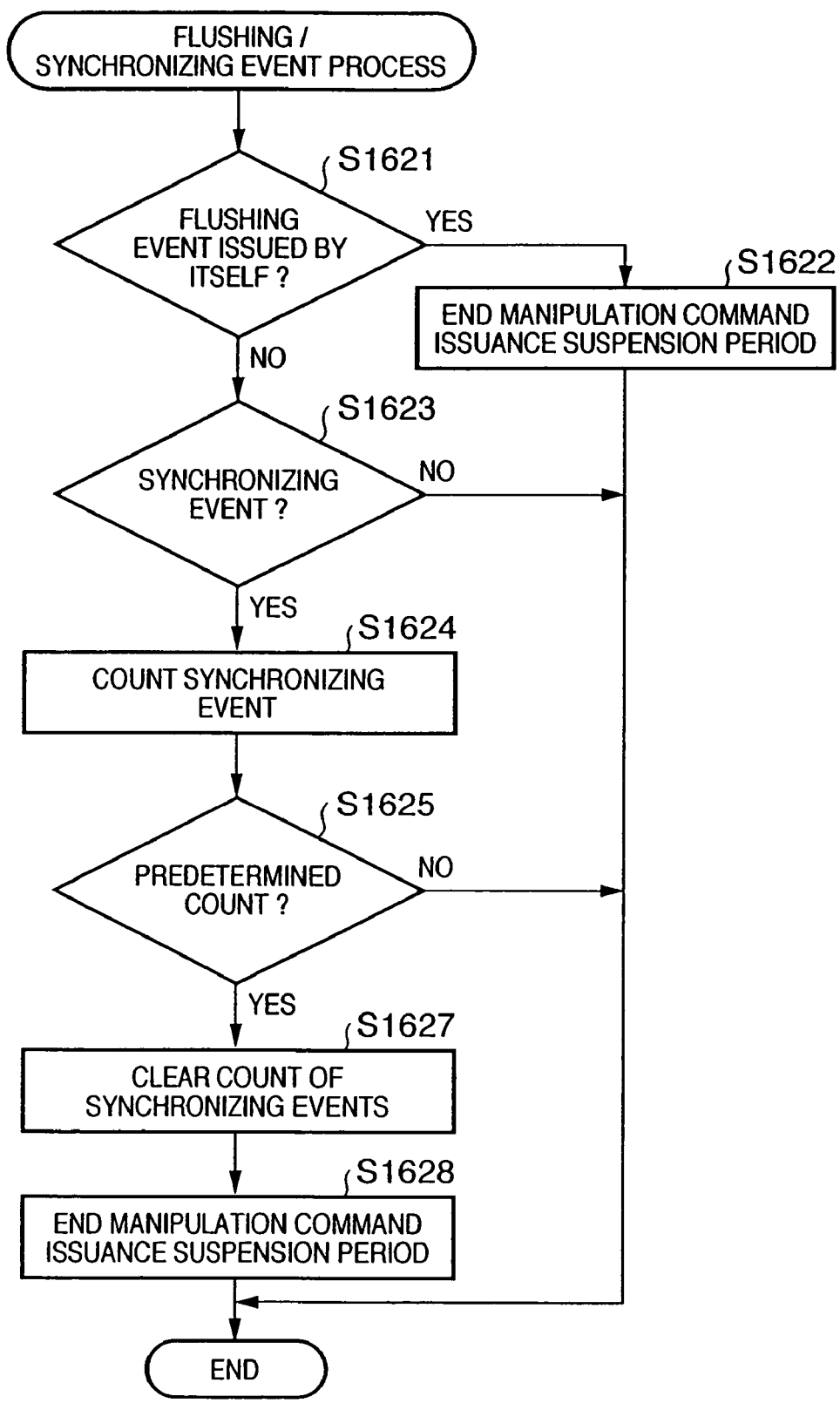
FIG. 16B is a flow chart showing a flushing/synchronizing event process in FIG. 16A.

The flushing/synchronizing event process in step S1612 will be explained below. FIG. 16B is a flow chart for explaining the flushing/synchronizing event process. It is checked in step S1621 if the event of interest is a flushing event issued by the self client. This can be checked with reference to the client ID field 811 and event type field 812 shown in FIG. 8B. If the event of interest is a flushing event issued by the self client, the flow advances to step S1622 to cancel the manipulation command issuance suspension state.

On the other hand, if the event of interest is not a flushing event issued by the self client, it is checked in step S1623 if the event of interest is a synchronizing event. If the event of interest is a synchronizing event, the synchronizing event is counted in step S1624, and it is checked if the count value has reached a predetermined value (step S1625). If the count value has reached a predetermined value, the flow advances to step S1627 to clear the count value of synchronizing events, and the manipulation command issuance suspension state is canceled (step S1628). If the count value of synchronizing events has not reached a predetermined value yet, this process ends.

Even processes in respective update modes will be explained below. In step S1608, a manipulation process corresponding to the manipulation event is immediately executed since the wait mode is set.

The immediate mode event process in step S1606 will be explained below with reference to FIG. 17.

Figure 17:
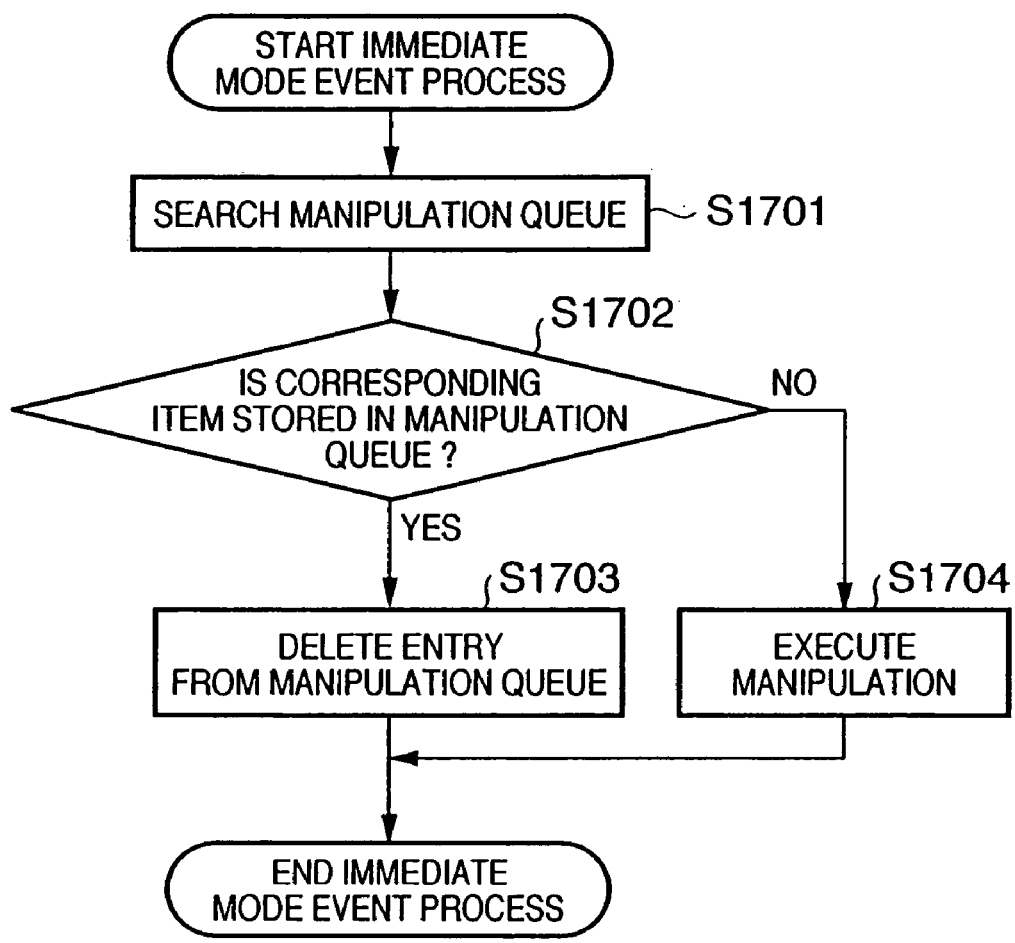
FIG. 17 is a flow chart of an immediate mode received event process in FIG. 16A.

FIG. 17 shows the flow of the immediate mode event process. The manipulation queue is searched in step S1701, and it is checked in step S1702 if a manipulation queue item corresponding to the received event is present in the manipulation queue. More specifically, if the client ID of the received event matches the ID of the client on which this process is running, and the manipulation ID of the received event matches that of a manipulation queue item, it is determined that the manipulation command of that manipulation queue item corresponds to that of the received event. In the immediate mode, if the corresponding queue item is found, its manipulation has already been executed at the time when it was generated at the client of interest. Therefore, the manipulation queue entry is deleted in step S1703 without executing any manipulation, thus ending the process. On the other hand, if it is determined in step S1702 that no corresponding queue item is found, that manipulation has not been executed yet since it was generated at a client other than the client of interest. Therefore, the manipulation is executed in step S1704, and the process ends.

Figure 18A:
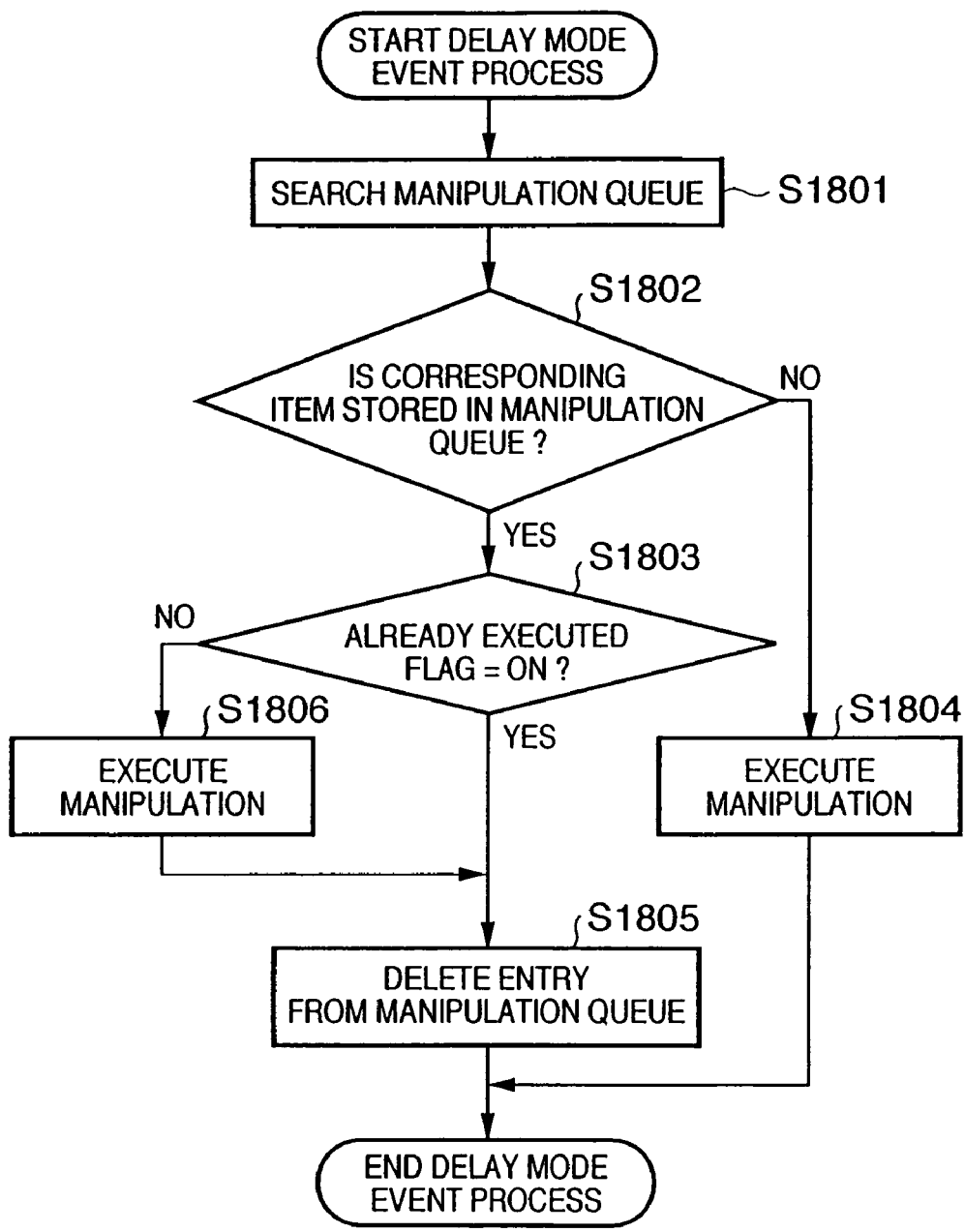
FIG. 18A is a flow chart of a delay mode received event process in FIG. 16A.
Figure 18B:
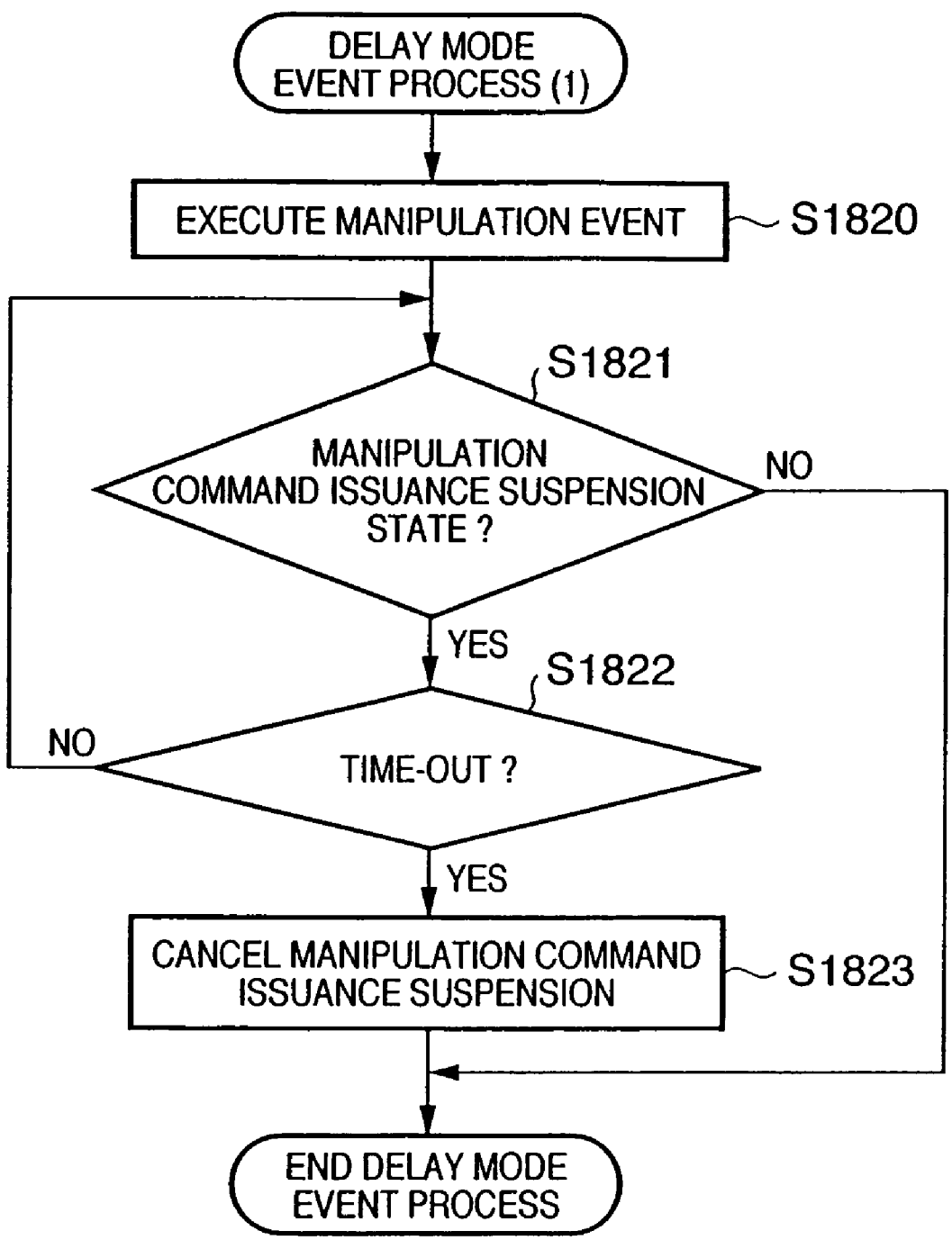
FIG. 18B is a flow chart showing a manipulation execution process in step S1804 in FIG. 18A.

The flow of the delay mode event process is as shown in FIGS. 18A and 18B.

The manipulation queue is searched in step S1801, and it is checked in step S1802 if a manipulation queue item corresponding to the received event is present in the manipulation queue. The process details in step S1802 are the same as in step S1702. If no manipulation queue item is found, it is determined that the manipulation event is issued by another client. In this case, since that manipulation event is generated by a client other than the client of interest, it has not been executed yet. Hence, the flow advances to step S1804 to execute that manipulation. Note that the process in step S1804 will be described using FIG. 18B.

On the other hand, if a corresponding manipulation queue item is present in the manipulation queue in step S1802 in FIG. 18A, the manipulation event is issued by the self client. In this case, the flow advances to step s1803 to check an already executed flag of the manipulation queue item. If the already executed flag is ON, since the time-out time has been reached, the timer process (to be described later) has already executed the manipulation. Therefore, the manipulation queue entry is deleted in step S1805 without executing any manipulation.

FIG. 18B is a flow chart for explaining a process upon executing a manipulation event in the delay mode, which is issued by another client. In step S1820, the manipulation event of interest is executed. It is checked in step S1821 if the self terminal is set in the manipulation command issuance suspension state. If the self terminal is not set in the manipulation command issuance suspension state, the process ends.

If the self terminal is set in the manipulation command issuance suspension state, the flow advances to step S1822 to check if a time-out time is reached. Whether or not the time-out time is reached can be checked with reference to the time-out time field 804 contained in the manipulation event of interest. If the time-out time is not reached, the flow returns to step S1821. If the count value of synchronizing event has reached a predetermined value before the time-out time, this process ends from step S1821. On the other hand, if the time-out time has been reached before the count value of synchronizing event reaches a predetermined value, the flow advances from step S1822 to step S1823 to cancel the manipulation command issuance suspension state.

On the other hand, if it is determined in step S1803 that the already executed flag is OFF, since the time-out time has not been reached yet, the manipulation is not executed. Hence, the manipulation is immediately executed in step S1806, and that item is deleted from the manipulation queue in step S1805.

Figure 19:
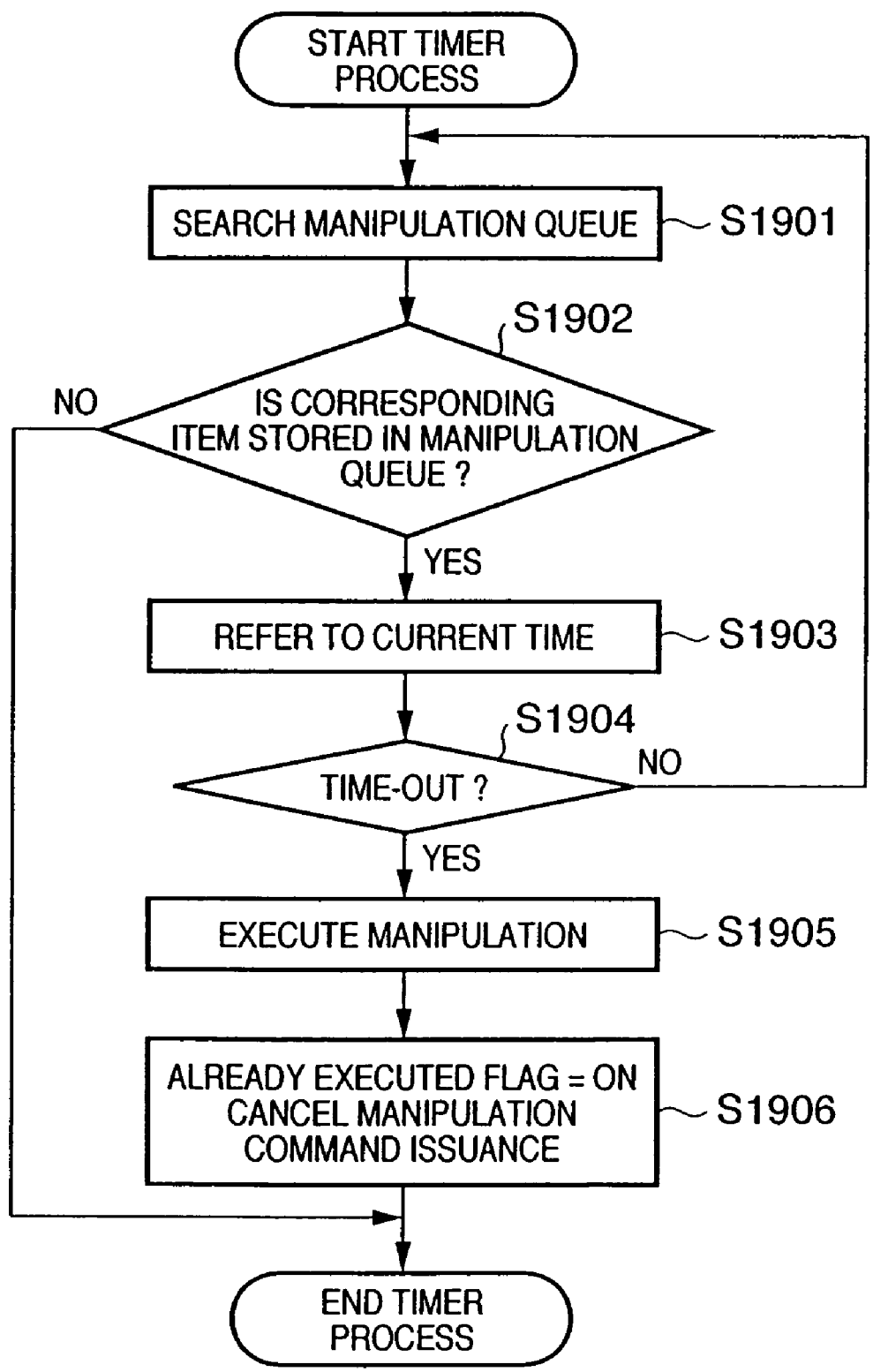
FIG. 19 is a flow chart for explaining a timer process.

The timer process launched in step S1504 in FIG. 15 will be described in detail below using FIG. 19. This process is executed to cope with a case wherein the time-out time has been reached in the delay mode.

The manipulation queue is searched in step S1901, and it is checked in step S1902 if a manipulation queue item corresponding to the manipulation, which is designated upon launching the timer process, is present. More specifically, if the manipulation ID as an argument upon launching this process matches that of the manipulation queue item, it is determined that the manipulation command of that manipulation queue item corresponds to that which is designated by the argument. If the corresponding queue item is found, this means that the received event corresponding to that manipulation command is not processed, that is, the manipulation command is not executed. In this case, the flow advances to a process for confirming if the time-out time is reached. That is, the current time is referred to in step S1903, and is compared with the time-out time (step S1904). If the time-out time has been reached, the manipulation is executed in step S1905, and the already executed flag of the corresponding manipulation queue item is set to ON. Also, the manipulation command issuance suspension state is canceled.

On the other hand, if the time-out time has not been reached yet, the flow returns to step S1901. If it is determined in step S1902 that no corresponding manipulation queue item is found, this means that the received event corresponding to that manipulation command has already been processed, i.e., the manipulation has already been executed. In this case, since neither execution of the manipulation nor the change process of the manipulation queue are required, the process directly ends.

Figure 20:
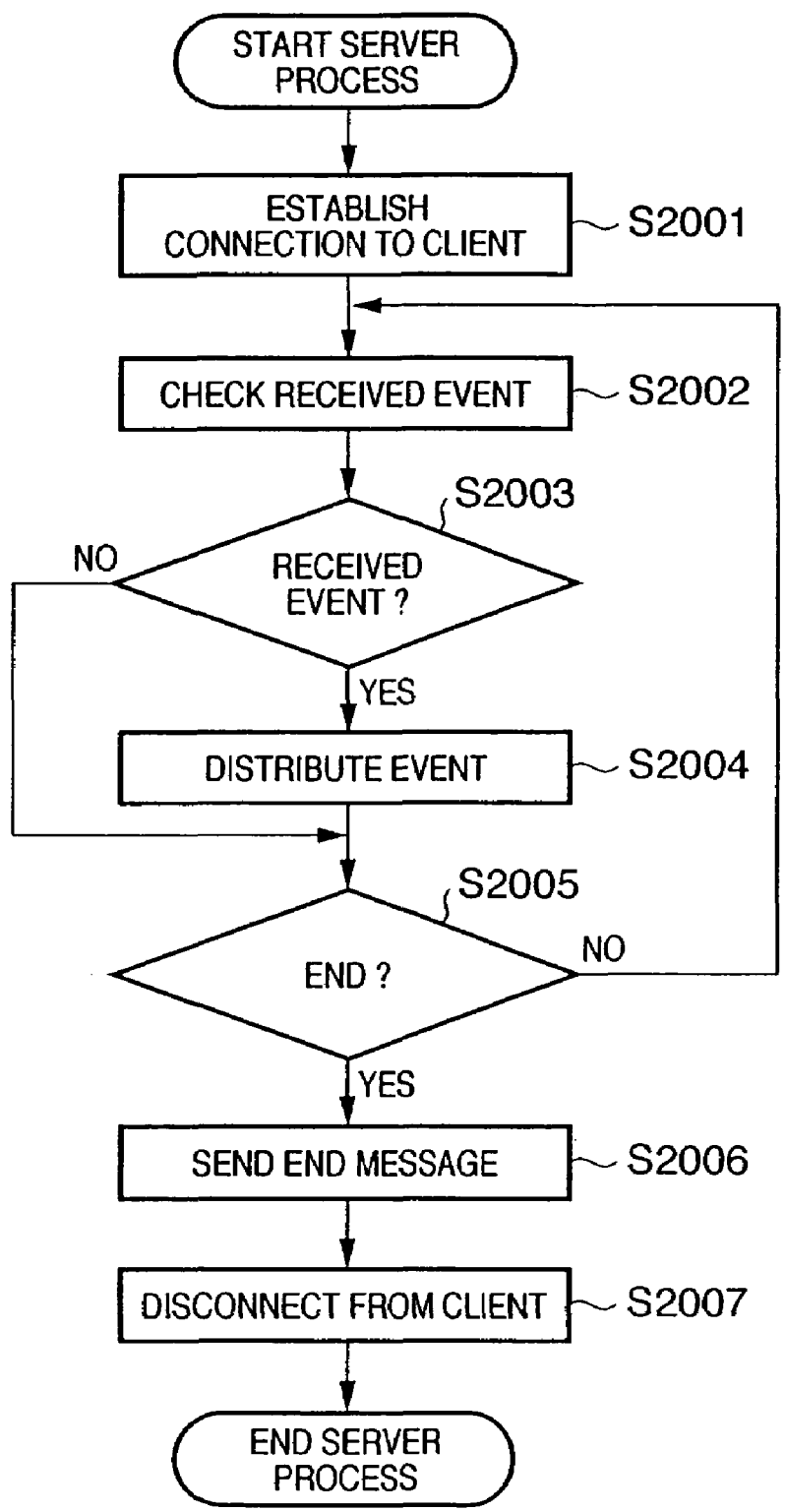
FIG. 20 is a flow chart for explaining a server process according to the first embodiment.

The flow of the client-side process has been explained. The flow of the server-side process will be described in detail below using FIG. 20.

In step S2001, the server accepts connection requests from clients to establish a communication. At this time, the server notifies the clients, with which the communication has been established, of client IDs. The server then searches the received event buffer (step S2002) to check if a received event is present (step S2003). If a received event is found, the flow advances to step S2004; otherwise, the flow jumps to step S2005. In step S2004, the server transmits the event to the connected clients. It is checked in step S2005 if the server process is to end in response to a user's command or the like. If the server process is to end, the flow advances to step S2006; otherwise, the flow returns to step S2002. In step S2006, the server notifies the connected clients that the process is to end, and disconnects connection to the clients (step S2007), thus ending the process.

The configuration of the database description file to be loaded by the client in this embodiment will be described below.

Figure 21:
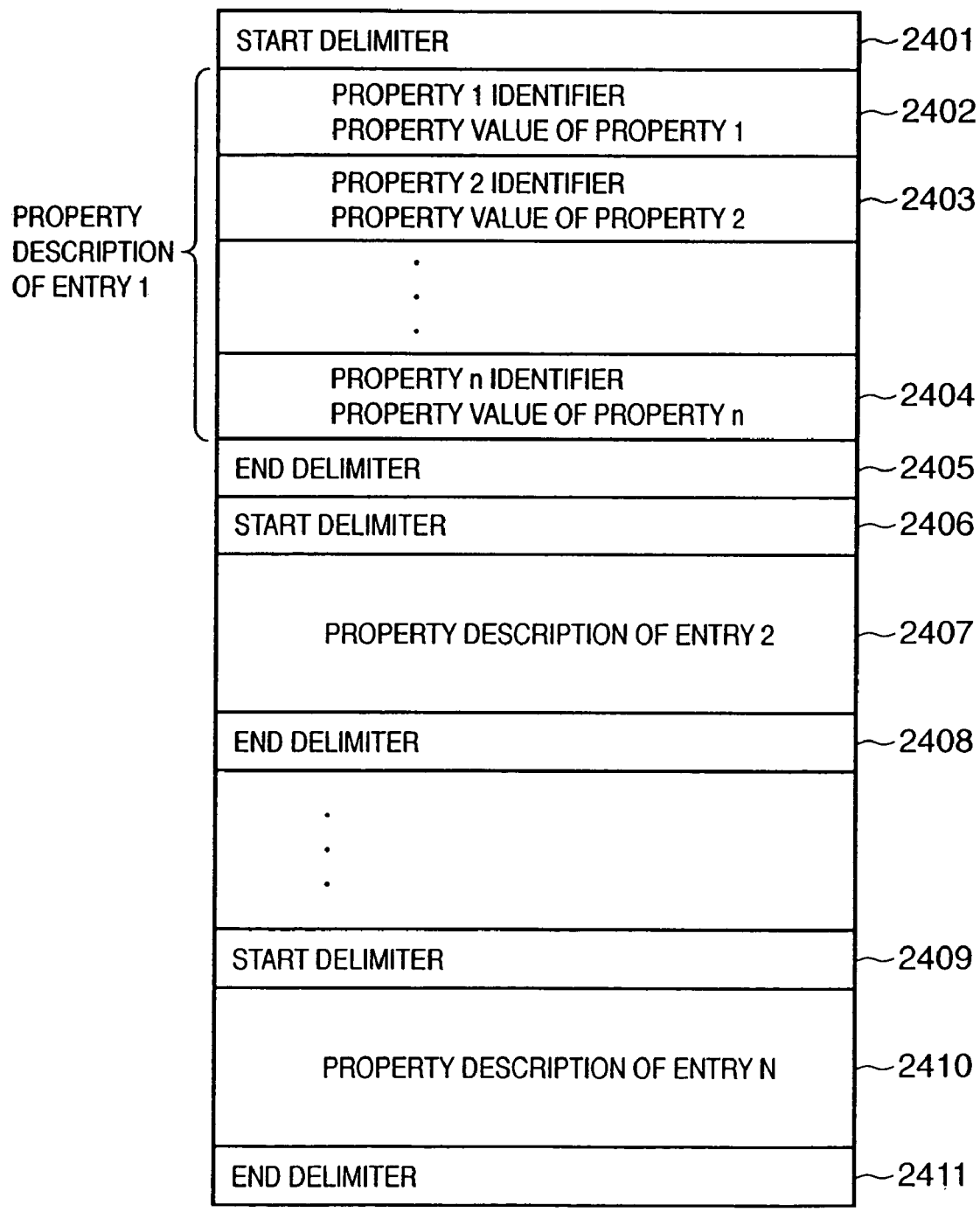
FIG. 21 shows the description file format of a database.

FIG. 21 shows the file format of data with N entries. The properties of each entry are described in fields bounded by start and end delimiters. In FIG. 21, the start delimiters of the first, second, and N-th entries are respectively denoted by 2401, 2406, and 2409. On the other hand, the end delimiters of these entries are 2405, 2408, and 2411. Each property of an entry is described as a pair of an identifier used to identify that property, and an attribute value, as indicated by 2402 to 2404. The update mode (including the flushing/synchronizing event mode) and time-out time are specified to each entry in the file with the above format. If the update mode of the entry of interest is other than the delay mode, the time-out time need not be described. In any update mode, these two properties need not always be described. If these properties are not described, they are set to be default values determined in advance by the system upon building the scene graph database on the memory (302 in FIG. 3) (step S1101).

As described above, this embodiment discloses an information processing method for maintaining consistency among shared data held by respective processes in a system in which each of a plurality of processes (client processes), which are connected via an information transmission medium to be able to communicate with each other, holds and uses shared data (database) to be shared by these processes. Especially, upon generation of a manipulation request for the shared data, request information (event) that represents the manipulation request is output onto the information transmission medium, response information (event) to this request information is received from the information transmission medium, and a manipulation for the shared data is executed in accordance with the received response information. According to such wait mode, since the manipulation for the shared data is executed in accordance with the event received via the information transmission medium, the update timings of the shared data can be matched with high precision.

In the delay mode, when a predetermined period of time has elapsed in the timer process after generation of the manipulation request before reception of response information, the manipulation for the shared data based on the manipulation request is executed without waiting for reception of the response information. For this reason, both the high response speed in a process as a generation source of the manipulation and matching of the synchronization timings among a plurality of processes can be achieved.

Also, according to this embodiment, a queue item is registered in the manipulation queue in accordance with a manipulation request. When the manipulation execution process executes the manipulation for the shared data, queue control for setting the corresponding queue item to be an already processed item is executed. When an item in the manipulation queue, which corresponds to a manipulation request represented by the response information, is not set to be an already processed item, the manipulation corresponding to the response information is executed for the shared data. For this reason, a given manipulation can be prevented from being repetitively executed in the aforementioned delay mode by a simple arrangement.

According to this embodiment, the system can operate in one of a plurality of change modes, which include a first mode (wait mode) for executing a manipulation of shared data after waiting for reception of response information in a reception process, and a second mode (delay mode) for executing a manipulation of shared data at an earlier one of an elapse timing of a predetermined period of time after generation of a manipulation request and a reception timing of response information.

Furthermore, the shared data is made up of a plurality of items (FIG. 21), each of which contains designation information used to designate a change mode to be adopted. The change mode is selected in accordance with this designation information, and a manipulation for the shared data is executed. That is, the change mode is switched for each of the plurality of items, and this configuration allows to select an appropriate change mode for each item.

Also, according to this embodiment, when a single client issues two or more successive manipulation commands, even in a situation in which after a first manipulation command is issued, a second manipulation command to be issued refers to the execution result of the first manipulation command, all manipulations can be appropriately executed, and their results can be reflected on the database.

Furthermore, according to this embodiment, when a plurality of clients successively issue manipulation commands, even a situation in which after a given client issues a first manipulation command, a second manipulation command to be issued refers to the execution result of the first manipulation command on another client which is different from the client as the source of the first manipulation command, all manipulations can be appropriately executed on all clients, and their results can be appropriately reflected on the databases of all the clients.

In a system in which each of a plurality of processes connected via an information transmission medium holds and uses shared data to be shared by these processes, a server process establishes connection to a plurality of client processes, and receives an event associated with a change in shared data from each of these client processes, so as to maintain consistency of shared data held by the respective processes. The server process then issues the received event to the plurality of client processes.

Second Embodiment

An embodiment in which the information processing method according to the present invention is applied to a virtual space sharing system which allows a plurality of terminals to share a scene database that describes the structure and properties of a virtual space upon expressing the virtual space by computer graphics data will be explained. Scene data as shared data, which is contained in the scene database, is expressed by, e.g., a scene graph.

Terms to be used in the following description will be defined. Each process in the system makes some "manipulation" that changes or refers to shared data. In this embodiment, an operation for changing or referring to the structure or property of the virtual space described in the scene database corresponds to "manipulation." The contents of such manipulation are transmitted to other processes via the communication path 102, and each process executes a process corresponding to the manipulation contents. Launching an operation will be expressed as "instructing a manipulation," data that represents the manipulation contents will be expressed as "manipulation event" or simply as "event," and executing a process according to the manipulation contents will be expressed as "execution of manipulation," hereinafter.

Each process has a buffer "received event buffer" that holds received manipulation events, and the number of events that can be stored in that buffer is finite. In order to prevent the received event buffer from overflowing due to many events that arrive within a predetermined period of time, in this embodiment, a process that executes a manipulation suppresses all processes from transmitting events during execution of that manipulation.

Suppressing event transmission will be expressed as "setting a suspend mode" or "suspending" hereinafter. Also, canceling suppression of event transmission will be expressed by "canceling a suspend mode." An event is used to set or cancel the suspend mode. Hence, the events used to set and cancel the suspend mode will be referred to as a "suspend setting event" and "suspend canceling event" when these events are distinguished from other types of events.

Each process includes a manipulation process that executes a manipulation to be done by the self process, and a received event process that processes a manipulation process transmitted from the self process or another process. FIG. 24 illustrates the processing sequence after a given process ("to-be-manipulated process" in FIG. 24) receives a manipulation event.

In the received event process, a manipulation event is received in procedure T301. In order to suppress other processes from transmitting events during the processing of the received manipulation event, a suspend setting event is transmitted to all processes in procedure T302.

After that, a manipulation corresponding to the manipulation event received in procedure T301 is executed (procedure T303). Upon completion of manipulation execution, a suspend canceling event is transmitted to all processes so as to cancel suppression of event transmission set for all the processes (procedure T304).

In a process executed in procedure T303, a data file of shared data (scene data in a database) to be manipulated must be loaded from the external storage device 306. Since the scene data describes the virtual space, it may have a large size. That is, a time period required to load and manipulate data in procedure T303 may become long, and the received event buffer may consequently overflow. Hence, in this embodiment, upon reception of a manipulation event that requires to load a file from the scene database, a suspend mode is set to prevent buffer overflow.

On the other hand, in a received event process of all processes other than the to-be-manipulated process in this system, the suspend setting event is received in procedure T305, and a suspend mode is set (procedure T306). Upon reception of the suspend canceling event transmitted in procedure T304 (procedure T307), the suspend mode is canceled (procedure T308). Therefore, event transmission is disabled from the end of procedure T306 until the end of procedure T308. As a result, when the manipulation process makes an attempt to transmit a manipulation event at a time indicated by, e.g., procedure T309, no event is transmitted since a suspend mode is set. An event is actually transmitted at a time indicated by procedure T310 after the suspend mode is canceled in procedure T308.

Figure 25:
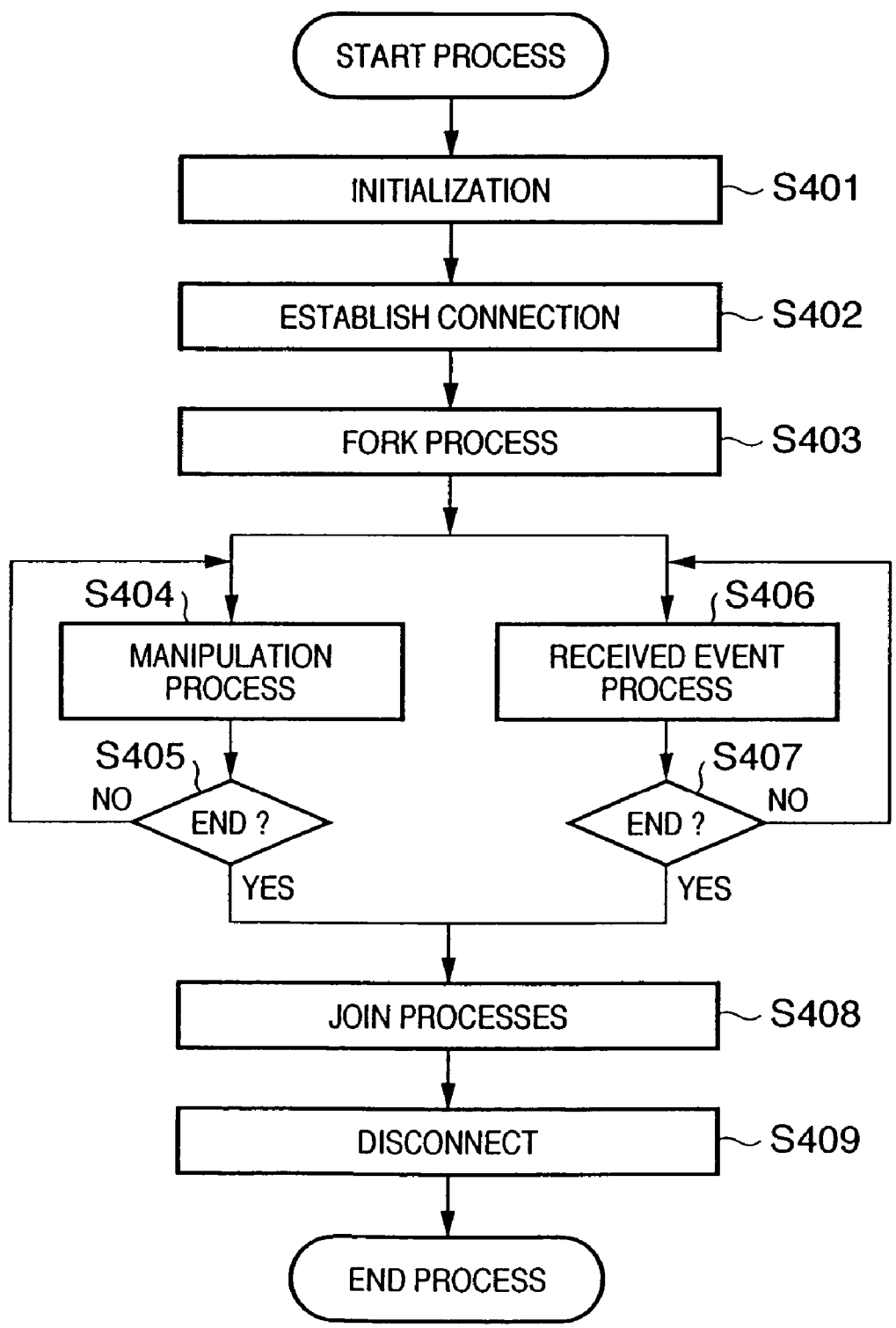
FIG. 25 is a flow chart for explaining the overall process in the second embodiment of the present invention.

FIG. 25 shows the flow of the processes of the overall process. When a process is started up, a series of initialization processes required for the operation of the process are executed in step S401. For example, a file that records data to be manipulated is loaded from the external storage device (306 in FIG. 3) or from an external device via the external IF module (310 in FIG. 3). Then, network connection to another process is established (step S402).

At this time, the server process 101 assigns, to the client process 103 to which connection has been established, a process ID used to uniquely identify that process and notifies all processes in the system of the process ID of the newly connected process. Each process generates new flag data called "suspend flag" in association with the notified process ID, and sets that flag to be OFF. The suspend flag is prepared for each of processes present in the system, and indicates whether or not the corresponding process sets a suspend mode.

In this embodiment, data exchange between two arbitrary processes is implemented using a one-to-one socket communication using TCP/IP (Transmission Control Protocol/Internet Protocol). Therefore, if the total number of processes is N, each process has at least N−1 socket communication paths. However, the configuration of the communication paths is not limited to such specific configuration, and any other configurations may be adopted as along as two arbitrary processes can logically exchange data. For example, the client processes 103, other than the server process 101, may establish communication paths to the server process 101, and the client processes 103 may always communicate with each other via he server process 101.

Next, in step S403 the process forks to parallelly execute a manipulation process and received event process in this process, i.e., to launch a manipulation process thread (step S404) for processing a manipulation command, and a received event process thread (step S406) for processing a received event. Note that the manipulation process and received event process will be described in detail later. In each of the manipulation process thread and received event process thread, it is checked in step S405 or S407 if an end instruction is detected. If NO in step S405 or S407, the flow returns to step S404 or S406 to repetitively process the manipulation command or received event. On the other hand, if YES in step S405 or S407, the two threads are joined in step S408. After network connection between the processes is disconnected (step S409), all the processes end.

Figure 26:
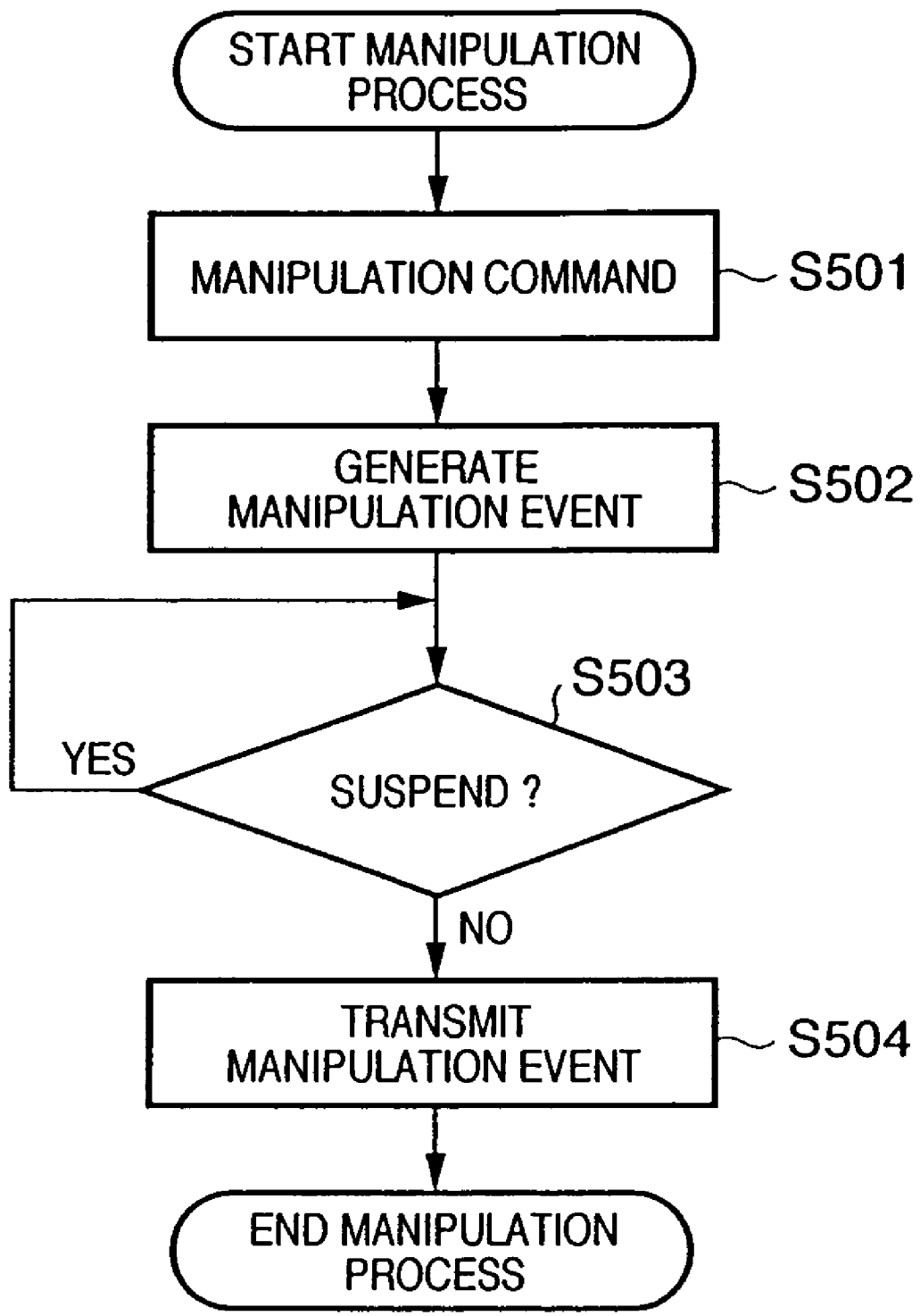
FIG. 26 is a flow chart for explaining a manipulation process according to the second embodiment.

The manipulation process in step S404 which is executed in the manipulation process thread in FIG. 25 will be described in detail below with reference to the flow chart of FIG. 26.

Initially, the contents of a manipulation command are input in step S501. A manipulation event corresponding to the manipulation command input in step S501 is generated (step S502). It is checked in step S503 with reference to the suspend flags if one of the processes suppresses event transmission. If event transmission is suppressed, the flow returns to step S503; otherwise, the flow advances to step S504. In step S504, the manipulation event generated in step S502 is transmitted to all the processes including the self process, thus ending the manipulation process.

Figure 27:
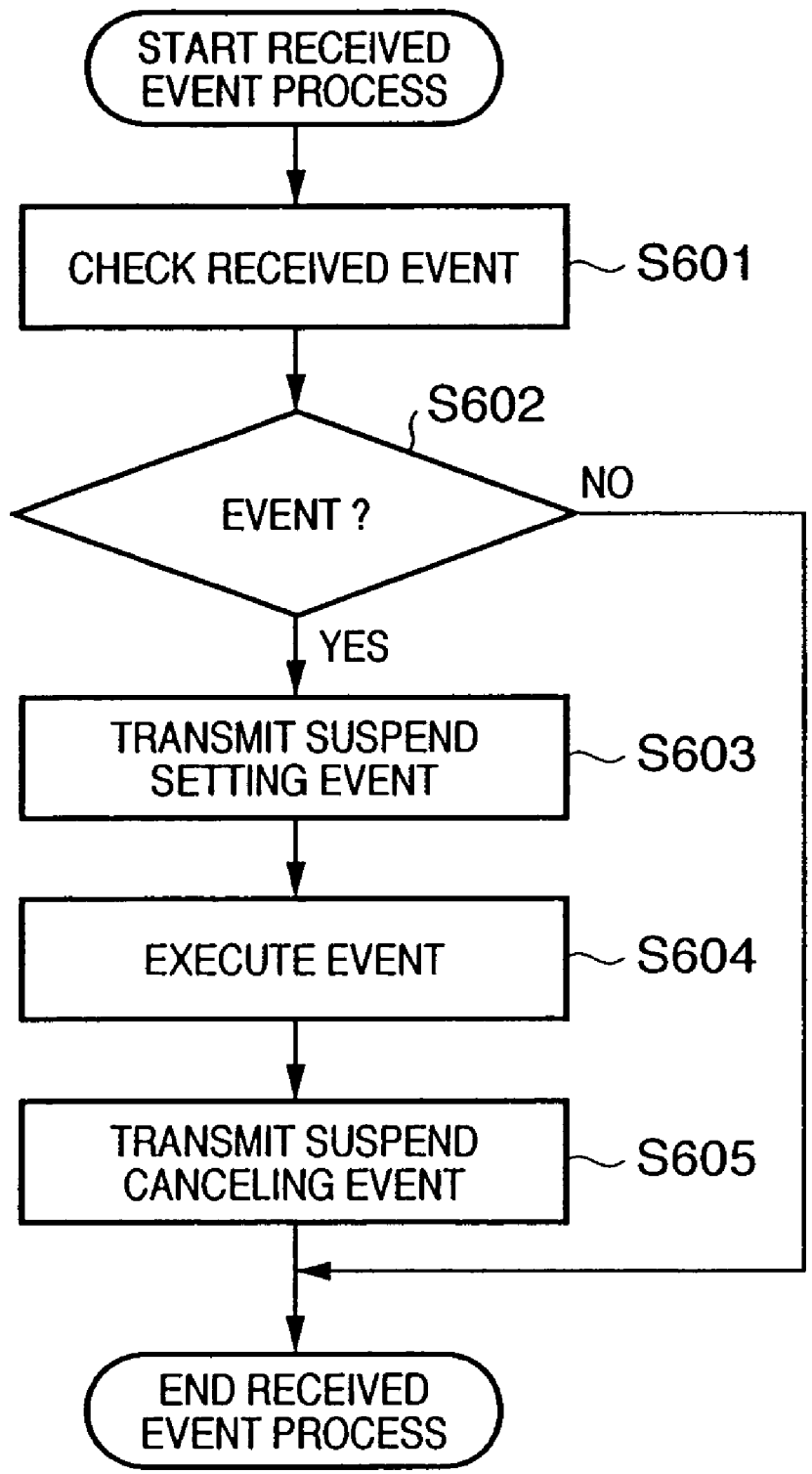
FIG. 27 is a flow chart for explaining a received event process according to the second embodiment.

The received event process in step S406 which is executed in the received event process thread in FIG. 25 will be described in detail below with reference to the flow chart of FIG. 27.

The received event is received by an event communication module (not shown) and is input to a received event buffer, which is assured in advance as an area of the storage device (e.g., the memory 302 or like). In step S601, the received event buffer is searched. It is checked in step S602 if an event is input to the received event buffer. If a received event is found, the flow advances to step S603. On the other hand, if it is determined that no received event is present, the process ends.

In step S603, a suspend setting event is transmitted to all the processes. Note that the suspend setting event contains the ID of the source process of that event. Next, the manipulation contents designated by the first one of received events stored in the received event buffer are executed after interpretation (step S604). Especially, if the event to be executed is the suspend setting event, the suspend flag corresponding to the process ID contained in that event is set to be ON. Conversely, if the event to be executed is a suspend canceling event, the suspend flag corresponding to the process ID contained in that event is set to be OFF. After execution of the event, an event that instructs to cancel the suspend mode is transmitted to all the processes in step S605, thus ending the process.

With the aforementioned process, while one of the processes which are running in the system executes a manipulation, all the process can be inhibited from transmitting events. As a result, the received event buffer can be prevented from overflowing due to a large number of events that arrive during execution of the manipulation, and the risk of unsuccessful execution of that manipulation can be greatly reduced.

Third Embodiment

In the second embodiment, a suspend mode is always set upon manipulating shared data. When shared data to be manipulated may have a large size like scene data that represents the virtual space, a buffer overflow prevention effect can be obtained by a simple process. However, since all processes are influenced while a suspend mode is set, it is more preferable to reduce the number of times of suspend setting itself. For this reason, this embodiment is characterized in that whether or not a suspend mode is to set is determined based on a given reference.

The reference used to determine whether or not a suspend mode is set in this embodiment will be described below. This reference is used to set a suspend mode when a time margin until the received event buffer overflows is less than a predetermined value and an event of a predetermined type is to be executed.

An equation that represents this reference is expressed by:

$$S = f \times Th(R(t), B) \tag{1}$$

If the value S given by this equation is 1, a suspend mode is set; if it is 0, a suspend mode is not set.

Note that "f" is a flag (also referred to as a "suspend target flag") determined for each event type. When a suspend mode is set for each event type, $f=1$; otherwise, $f=0$. "Th(a, b)" is a function of implementing a binarization process; If first argument a is less than second argument b, this function returns 1; otherwise, it returns 0. "R(t)" is the remaining time period until a given time t at which a suspend setting event must be transmitted to prevent the received event buffer from overflowing, and "B" is a positive constant which has a time period as a unit.

In this embodiment, R(t) in equation (1) is defined by:

$$R(t) = n(t)/(r(t) - p(t)) - \alpha(t) \quad (2)$$

where n is the number of empty slots of the reception buffer, r is the number of events arrived per unit time period, i.e., the event arrival rate, and p is the number of events that have been manipulated per unit time, i.e., the event processing rate. α is a time period (also referred to as "suspend setting delay time period") from when a suspend setting event transmission process is launched until that event is processed and a suspend mode is set. "(t)" is a corresponding value at time t. Note that "slot" indicates a storage area that stores each individual event in the received event buffer. Therefore, if the number of empty slots is 10, the remaining number of events that can be received is 10.

The flow of the processes of the process in this embodiment will be described below. In this embodiment, the flow of the processes of the overall process is substantially the same as that in the second embodiment (FIG. 25) except for the contents of the initialization process (step S401) and received event process (step S406).

In this embodiment, the initialization process (step S401) loads a data file that holds initial values of the suspend target flag, event arrival rate, event processing rate, and suspend setting delay time period from the external storage device (e.g., 306 in FIG. 3) and sets them in respective parameters, in addition to that executed in the second embodiment.

These initial values of the parameters may be set by arbitrary methods, i.e., a method of setting the initial values in a program that represents the processing contents, a method of inputting the initial values from another device via the external IF module (310 in FIG. 3), or a method of allowing the user to interactively set the initial values and the like, in addition to the method of loading the initial values from the file.

Figure 28:
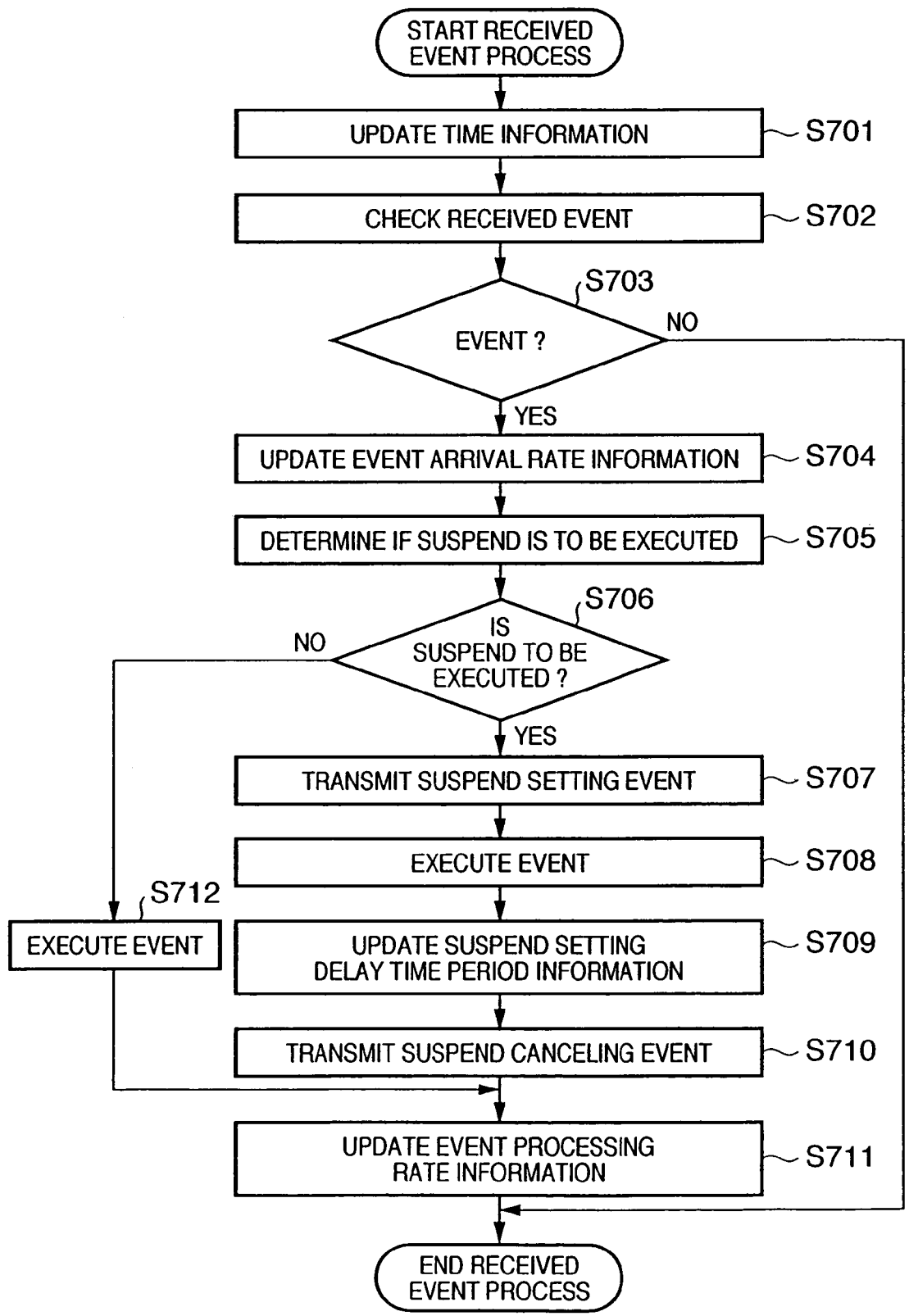
FIG. 28 is a flow chart for explaining a received event process according to the third embodiment.

The received event process (corresponding to step S406 in FIG. 25) in this embodiment will be described below using the flow chart shown in FIG. 28.

Upon starting the received event process, information indicating the processing start time is acquired from a timepiece module present in the terminal, a time server present on the system, or the like in step S701. In step S702, the received event buffer is searched. It is checked in step S703 if a received event is input to the received event buffer. If a received event is found, the flow advances to step S704. On the other hand, if it is determined that no received event is found, the process ends.

The event arrival rate is calculated in step S704, and the value of equation (1) above is calculated (step S705). Note that the event arrival rate may be calculated in step S704 on the basis of a difference between current time information which was saved upon execution of step S704 in the previous received event process, and current time information upon current execution. However, the calculation method is not limited to such specific method, and arbitrary statistical methods may be used in calculation.

In step S705, the remaining parameters used to calculate the value of equation (1), i.e., the number n of empty slots of the reception buffer, event processing rate p, and suspend setting delay time period α, are stored in, e.g., the memory 302 or the like, and undergo update processes at predetermined periods or timings for respective parameters, as will be described later. Also, the value of the suspend target flag f, the event type and suspend target flag value can be obtained with reference to a table which is set upon initialization using event type information contained in the received event.

If S=1, i.e., if it is determined in step S706 that a suspend mode is to be set, the flow advances to step S707; otherwise (S=0), and the flow advances to step S712. In step S707, a suspend setting event is transmitted to all processes. Next, manipulation contents designated by the first one of events which are stored in the reception buffer are executed after interpretation (step S708).

In step S709, the suspend setting delay time period is calculated and updated. In this embodiment, the suspend setting event transmitted in step S707 contains its transmission time information, and the suspend setting delay time period is calculated as a difference between the transmission time and the execution time of step S709. That is, this embodiment is made under the condition that the delay time period of the suspend setting event transmitted by the self process is nearly equal to that of the suspend setting event transmitted by another process, and the times of all terminals match. In order to match the times of terminals which form the system of this embodiment, for example, NTP (Network Time Protocol) can be used.

In step S710, a suspend canceling event is transmitted to all processes. In step S711, the event processing rate is calculated and updated, thus ending the process. In this embodiment, the event processing rate is calculated on the basis of the time acquired in step S701 and the execution time information of step S711. However, the calculation method is not limited to such specific method, and the event processing rate may be calculated by arbitrary statistical methods.

On the other hand, if it is determined in step S706 that S=0, an event is executed in step S712 in the same manner as step S708, and the event processing rate information is updated in step S711, thus ending the process.

As described above, according to this embodiment, since a suspend mode can be set in accordance with a specific condition, the number of times of suspend setting can be suppressed while preventing overflow of the reception buffer.

Fourth Embodiment

In the third embodiment, of parameters used to determine whether or not a suspend mode is to be set, the event arrival rate r, event processing rate p, and suspend setting delay time period α updated every time the received event process is executed. Alternatively, one or a plurality of these parameters may be fixed to a predetermined value or values.

The fixed values can be set by arbitrary methods such as a method of loading the fixed values described in a file in the initialization step (step S401), a method of setting the fixed values in a program that represents the processing contents, a method of inputting the fixed values from another device via the external IF module (310 in FIG. 3), a method of allowing the user to interactively set the fixed values, and the like.

Fifth Embodiment

In the third and fourth embodiments, whether or not a suspend mode is to be set is determined using all parameters, i.e., the suspend target flag f, the number n of empty slots of the reception buffer, the event arrival rate r, the event processing rate p, and the suspend setting delay time period α. Alternatively, determination may be made based on one or a plurality of these parameters.

For example, determination may be made based only on the type of the received event (i.e., only the value of the suspend target flag f) or on the value of the number n of empty slots of the reception buffer.

Sixth Embodiment

A selective suspend setting process may be attained by a method different from those in the third to fifth embodiments. This embodiment is characterized in that a suspend mode is set only when event execution is not completed within a given time period from the beginning of event execution.

In the following description, a time period from the beginning of event execution until transmission of a suspend setting event will be expressed as "suspend waiting time period," a time at which a suspend setting event is to be transmitted will be expressed as "time-out time," and a state wherein event execution is not completed until the time-out time will be expressed as "generation of a time-out."

Figure 29:
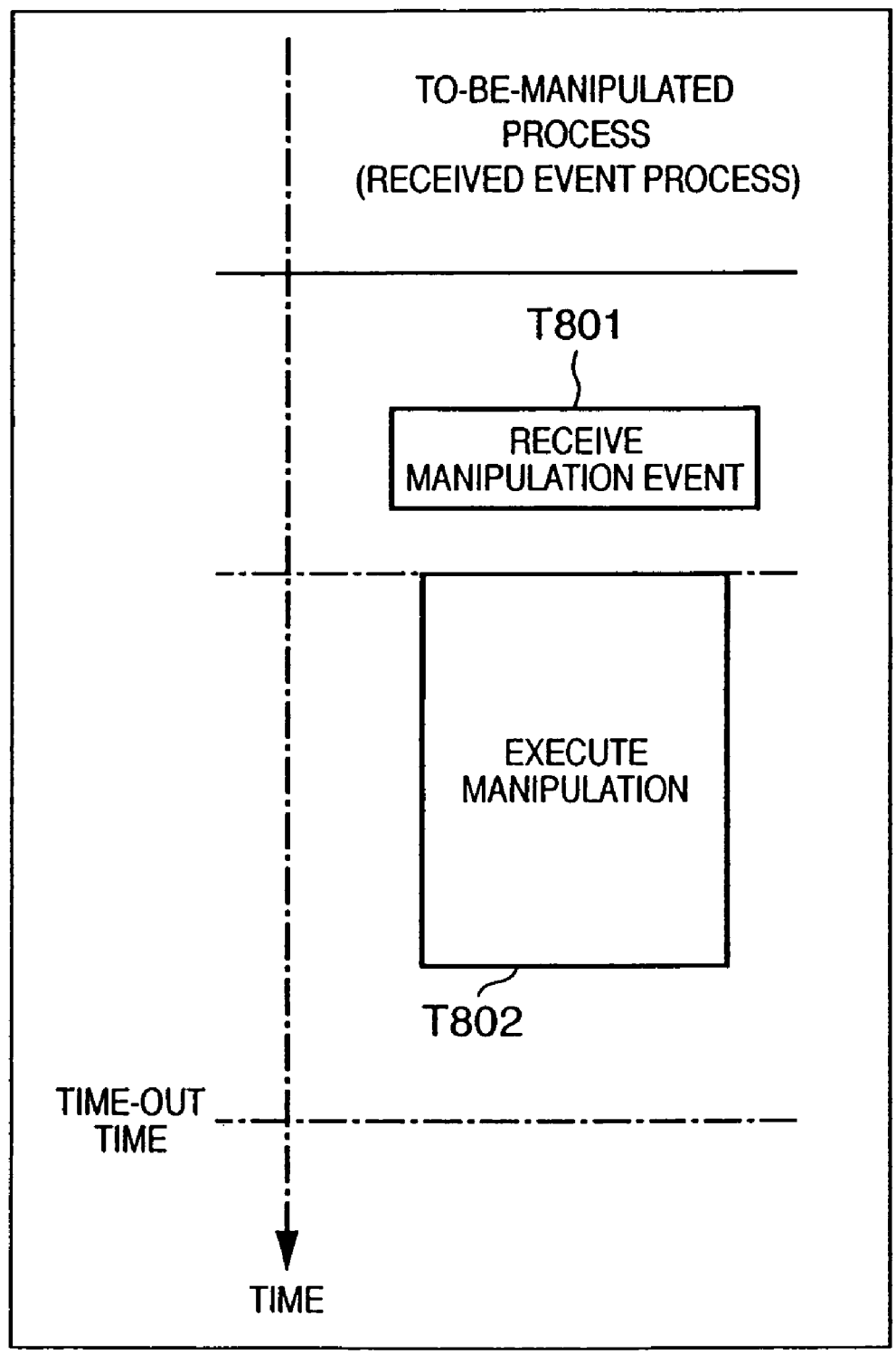
FIG. 29 is a chart showing the processing sequence of a received event process when no time-out is generated according to the sixth embodiment.

Some steps of the received event process (corresponding to step S406 in FIG. 25) in this embodiment will be explained below using FIGS. 29 and 30. FIG. 29 shows the sequence when no time-out is generated. In this case, a manipulation event is received (procedure T801), and its manipulation contents are executed (procedure T802). In this case, since manipulation execution is complete before the time-out time, a time-out is not generated, and a suspend mode is not set. Since no suspend mode is set, it is not canceled.

Figure 30:
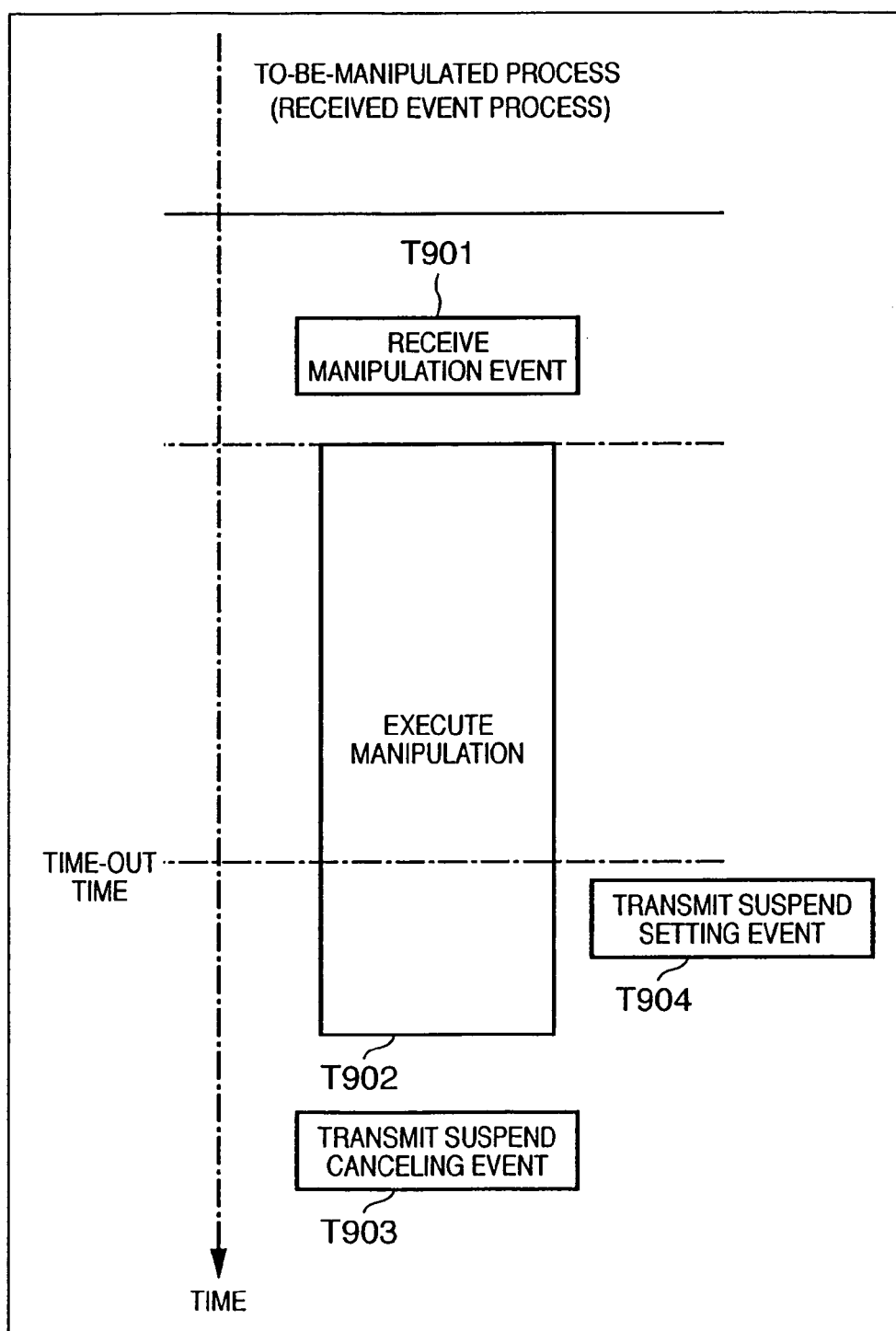
FIG. 30 is a chart showing the processing sequence of a received event process when a time-out is generated according to the sixth embodiment.

On the other hand, in case of FIG. 30, since the time-out time is reached (a time-out is generated) during execution (procedure T902) of a manipulation event received in procedure T901, a suspend setting event is transmitted in procedure T904. After completion of manipulation execution, the suspend mode is canceled (procedure T903).

Figure 31:
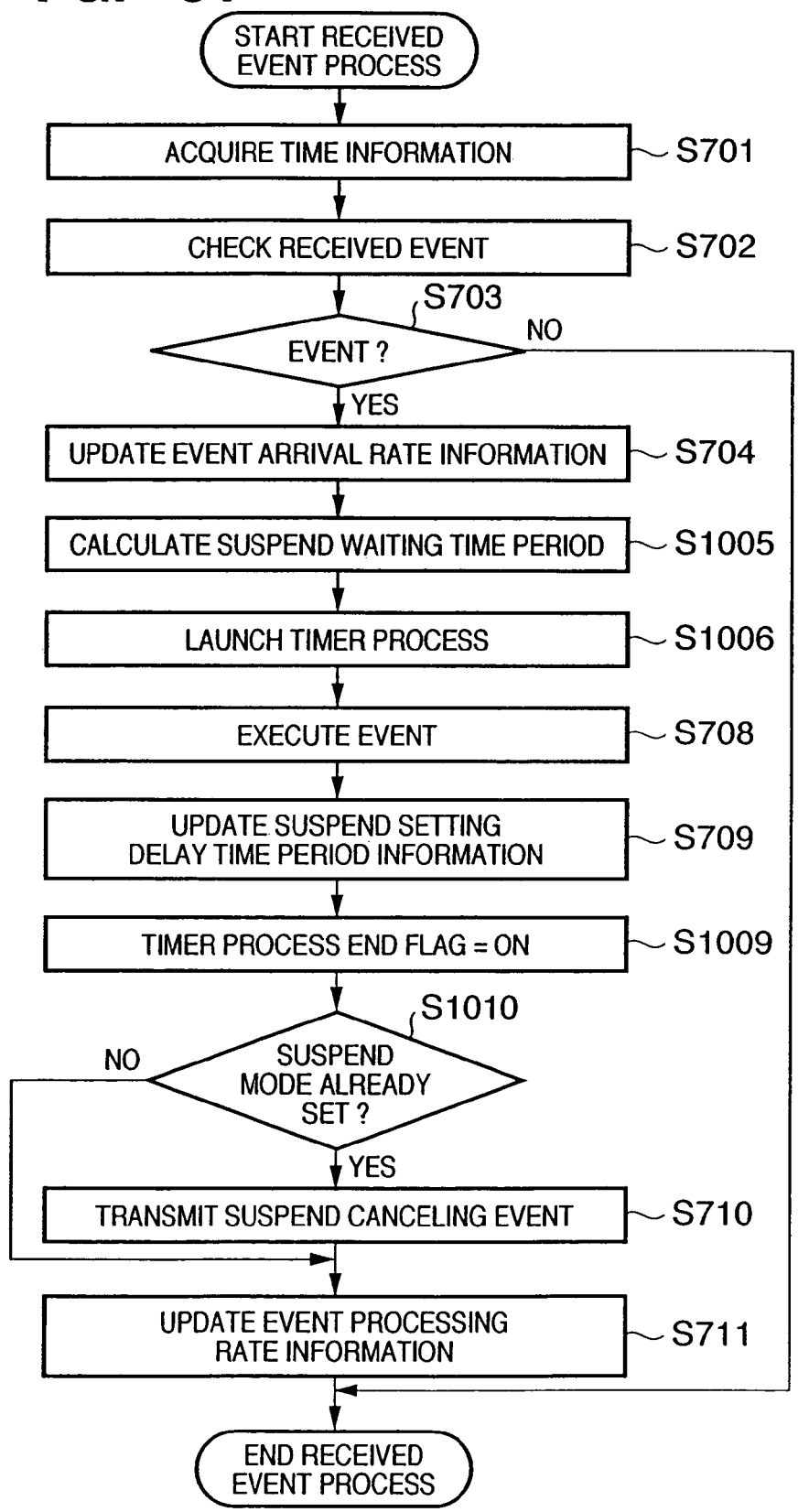
FIG. 31 is a flow chart for explaining a received event process according to the sixth embodiment.

FIG. 31 shows the flow of processes in the received event process (corresponding to step S406 in FIG. 25) in this embodiment. The same step numbers in FIG. 31 denote the same processes as those in FIG. 28 which is used to explain the received event process according to the third embodiment, and a repetitive description thereof will be avoided. Note that a timer process end flag (to be described later) is set to be OFF at the beginning of the process shown in FIG. 31.

In step S1005, the value R(t) of equation (2) above is calculated and is set as a suspend waiting time period. In step S1006, a time-out time is calculated from the current time and the suspend waiting time period, and a timer process is launched using the time-out time as an argument. The timer process can parallelly run as an independent thread of the received event process by forking the process, as in step S403 in FIG. 25.

In the received event process, as has been described in the third embodiment, the event execution process and the update process of the suspend setting delay time period α are done in steps S708 and S709, and "timer process end flag" that instructs the timer process to end is set to be ON in step S1009. In this way, the timer process thread ends.

If it is determined in step S1010 with reference to the suspend flags that the suspend flag corresponding to the self process is set to be ON (i.e., event execution in step S708 reached the time-out time, and the timer process is set at suspend mode), the flow advances to step S710; and if the flag is OFF, the flow advances to step S711, thus ending the process.

Figure 32:
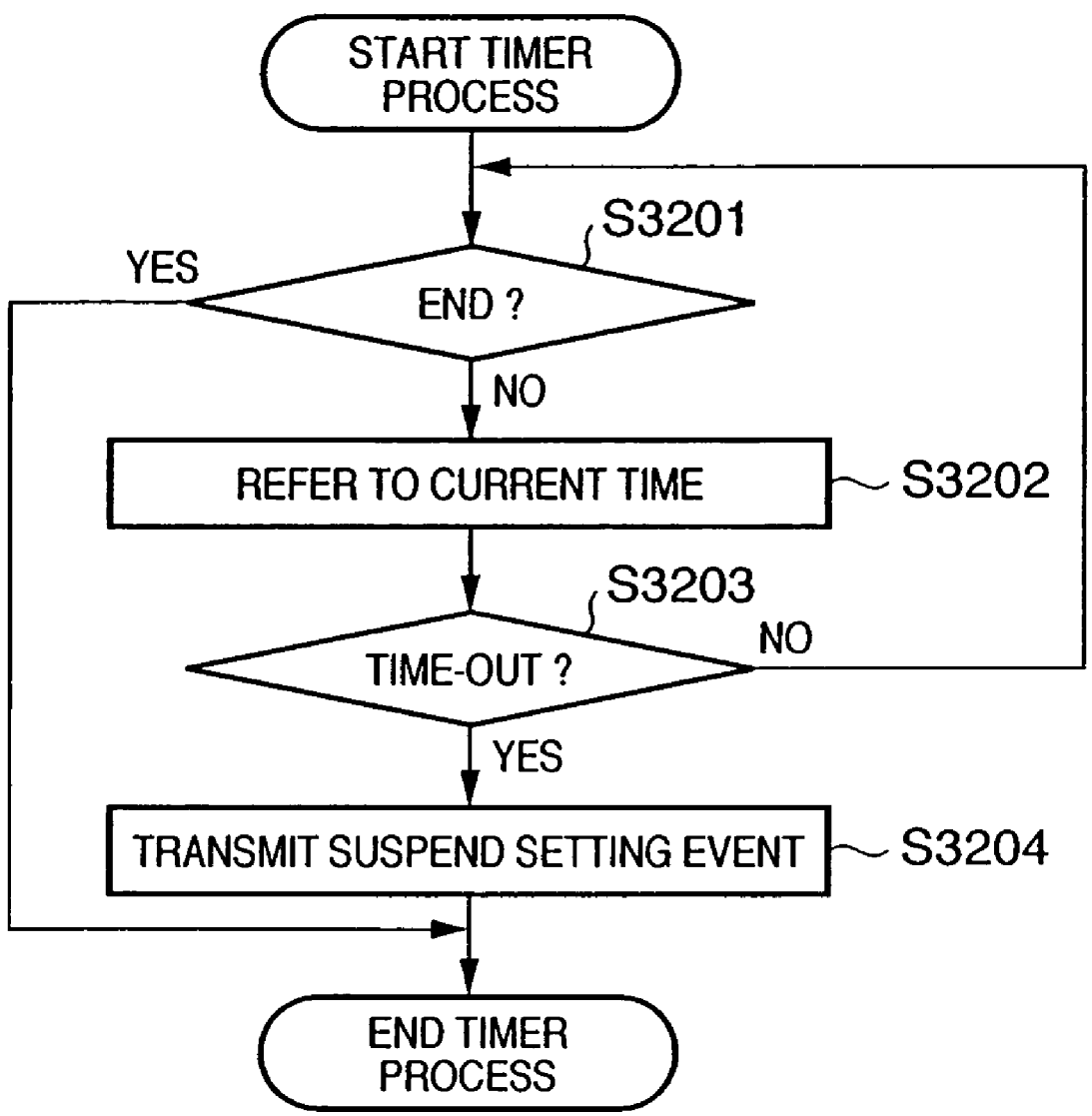
FIG. 32 is a flow chart for explaining a timer process according to the sixth embodiment.

The flow of the timer process executed in this embodiment will be explained below using the flow chart of FIG. 32. The timer process runs parallel to the received event process, as described above. When the process starts, the timer process end flag is referred to in step S3201 to check if it is ON. If it is determined that the flag is ON, the process ends; otherwise, the flow advances to step S3202. In step S3202, the current time is compared with the time-out time. If the current time has reached the time-out time (a time-out is generated) (step S3203), the flow advances to step S3204; otherwise, the flow returns to step S3201. In step S3204, a suspend setting event is transmitted, and the process ends.

As described above, according to this embodiment, only when a time period required to process an event is long, and the received event buffer may overflow, the suspend mode can be adaptively set.

Seventh Embodiment

In the sixth embodiment as well, one or a plurality of the event arrival rate, event processing rate, and suspend setting delay time period may be fixed to a predetermined value or values.

The fixed values can be set by arbitrary methods such as a method of loading the fixed values described in a file in the initialization step (step S401), a method of setting the fixed values in a program that represents the processing contents, a method of inputting the fixed values from another device via the external IF module (310 in FIG. 3), a method of allowing the user to interactively set the fixed values, and the like.

Eighth Embodiment

In the sixth and seventh embodiments as well, the suspend waiting time period may be calculated based on one or a plurality of the suspend target flag, the number of empty slots of the reception buffer, the event arrival rate, the event processing rate, and the suspend setting delay time period, as has been explained in the fifth embodiment.

For example, the suspend waiting time period may be calculated based only on the number n of empty slots of the reception buffer.

Ninth Embodiment

In the third to eighth embodiments, the event arrival rate r, event processing rate p, and suspend setting delay time period α to be used are obtained by calculating values at a given time t (except for the fourth and seventh embodiments that use the fixed values). However, as these parameters, other kinds of statistical numerical values such as an average value, maximum value, minimum value, and the like may be used.

For example, when the event arrival rate r uses a maximum value, the event processing rate p uses a minimum value, and the suspend setting delay time period α uses a maximum value, the risk of overflow of the reception buffer can be further reduced.

Other Embodiments

Note that the aforementioned database description file describes the update mode to be selected. By contrast, one or a plurality of update modes that cannot be selected may be set.

In the above description, a data communication between the server and client is attained by a one-to-one TCP/IP socket communication. Alternatively, events may be exchanged by broadcast or multicast, and the communication protocol is not limited to TCP/IP.

The Ethernet® is used as the communication medium. Alternatively, other information transmission media such as USB, Firewire, and the like may be used. Furthermore, the network is not limited to the LAN, and connections via a WAN may be adopted or both the LAN and WAN may be used in combination.

The number of servers is not limited to one per shared database system, and a plurality of servers may be connected.

In this case, processes may be arbitrarily assigned to respective servers. For example, different servers may be used for respective clients, or servers may be prepared in correspondence with respective database entries.

Furthermore, the number of processes to be assigned to each terminal is not limited to one process per terminal, but a plurality of processes can run on one terminal. In this case, arbitrary types of processes may be combined, and the system operates in all combinations of only client processes, only server processes, and client and server processes. Note that processes which run on a single terminal may exchange data via a shared memory in place of the network.

Events are distributed to respective terminals via the server. Alternatively, a terminal on which the data manipulation has been made may directly transmit an event to other terminals.

In the above description, 3D virtual space data is shared. However, the contents of the database are not limited to such specific data, and arbitrary contents may be shared. Also, the method explained in the above embodiment can be applied to not only a case wherein the entire database is to be shared but also a case wherein the database is to be partially shared. These features also apply to other embodiments.

In the above description, data to be manipulated by each process is the virtual space scene database to be shared among processes. However, data to be manipulated may be data that describes arbitrary other contents.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention and a storage medium in which the computer program is stored.

In this case, so long as the system or apparatus has the functions of the program, the program may be executed in any form, such as an object code, a program executed by an interpreter, or script data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As described above, according to the present invention, a mechanism that guarantees issuance of a subsequent manipulation command after execution of the previously issued manipulation command for manipulations to be made for shared data which are shared by a plurality of processes can be provided, thus removing limitations on manipulation command issuance timings.

Also, according to the present invention, in a system in which a plurality of processes make collaborative operations based on data exchange, transmission of event information is limited based on various conditions to prevent or suppress overflow of a reception buffer used by each process, thus implementing highly reliable processes by a simple method.

As many apparently widely different embodiments of the present invention can be made without departing from the spirit and scope thereof, it is to be understood that the invention is not limited to the specific embodiments thereof except as defined in the appended claims.

The invention claimed is:

1. An information processing method for maintaining, in a system in which each of a plurality of client processes, connected via an information transmission medium, holds and uses shared data to be shared by the plurality of client processes, consistency of shared data held by the respective plurality of client processes, comprising:
   a holding step of holding the shared data;
   a first issuance step of issuing, in response to a manipulation event request, a manipulation event that represents the manipulation to the shared data to the server process;
   a first manipulation execution step of executing a manipulation to the shared data in response to a manipulation event received from the server process;
   a second issuance step of issuing a first synchronizing event to the server process; and
   an inhibition step of inhibiting issuance of the manipulation event in the first issuance step after the first synchronizing event is issued in the second issuance step until a number of second synchronizing events received from the server process reaches a number equal to a number of the plurality of client processes,
   wherein the second synchronizing events received from the server process includes a synchronizing event corresponding to the first synchronizing event issued in the second issuance step and a synchronizing event issued by another client process.

2. The method according to claim 1, further comprising a second manipulation execution step of executing a manipulation corresponding to the manipulation event when the limit time has elapsed while the manipulation event remains unexecuted, and wherein the manipulation event has a limited time, and the inhibition step includes a step of canceling an inhibition state in response to execution of the manipulation event.

3. The method according to claim 1, further comprising:

a manipulation request holding step of holding, when a manipulation request is generated during a period in which issuance of manipulation events is inhibited in the inhibition step, the manipulation request in a queue, and the first and second issuance steps include a step of issuing, when inhibition in the inhibition step is canceled, a manipulation event corresponding to the manipulation request held in the queue or an issuance inhibition event onto the information transmission medium.

4. An information processing apparatus for maintaining, in a system in which each of a plurality of client processes, connected via an information transmission medium, holds and uses shared data to be shared by the plurality of client processes, consistency of shared data held by the respective plurality of client processes, comprising:

a holding unit adapted to hold the shared data;

a first issuance unit adapted to issue, in response to a manipulation event request, a manipulation event that represents the manipulation to the shared data to the server process;

a first manipulation execution unit adapted to manipulate the shared data in response to a manipulation event received from the server process;

a second issuance unit adapted to issue a first synchronizing event to the server process; and an inhibition unit adapted to inhibit issuance of the manipulation event by said first issuance unit after the first synchronizing event is issued by said second issuance unit until a number of second synchronizing events received from the server process reaches the number equal to a number of the plurality of client processes, wherein the second synchronizing events received from the server process includes a synchronizing event corresponding to the first synchronizing event issued in the second issuance step and a synchronizing event issued by another client process.

5. A storage medium storing a control program for making a computer execute an information processing method of claim 1.

* * * * *